US012615423B2

(12) United States Patent
Shimizu

(10) Patent No.: US 12,615,423 B2
(45) Date of Patent: Apr. 28, 2026

(54) DISPLAY DEVICE AND IMAGING APPARATUS

(71) Applicant: FUJIFILM Corporation, Tokyo (JP)

(72) Inventor: Takayuki Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 144 days.

(21) Appl. No.: 18/399,754

(22) Filed: Dec. 29, 2023

(65) Prior Publication Data

US 2024/0236453 A1      Jul. 11, 2024

(30) Foreign Application Priority Data

Jan. 6, 2023      (JP) ................................. 2023-001191

(51) Int. Cl.
| | |
|---|---|
| *H04N 23/53* | (2023.01) |
| *G03B 17/04* | (2021.01) |
| *G03B 17/12* | (2021.01) |
| *G03B 17/55* | (2021.01) |
| *H04N 23/51* | (2023.01) |

(52) U.S. Cl.
CPC ........... *H04N 23/531* (2023.01); *G03B 17/04* (2013.01); *G03B 17/12* (2013.01); *G03B 17/55* (2013.01); *H04N 23/51* (2023.01); *G03B 2217/002* (2013.01)

(58) Field of Classification Search
CPC ........ G03B 17/04; G03B 17/12; G03B 17/55; G03B 2217/002; H04N 23/51; H04N 23/531
See application file for complete search history.

(56) References Cited

U.S. PATENT DOCUMENTS

| | | | | |
|---|---|---|---|---|
| 12,346,009 | B2 * | 7/2025 | Kuroki | H05K 7/20154 |
| 2009/0244363 | A1 * | 10/2009 | Sugimura | H04N 23/60 |
| | | | | 348/E5.025 |
| 2015/0049243 | A1 * | 2/2015 | Samuels | G03B 17/55 |
| | | | | 348/374 |
| 2020/0344922 | A1 * | 10/2020 | Wada | H05K 7/20172 |
| 2023/0035644 | A1 * | 2/2023 | Kuroki | G03B 17/55 |

FOREIGN PATENT DOCUMENTS

| | | |
|---|---|---|
| JP | 2020031285 | 2/2020 |
| JP | 2020031286 | 2/2020 |

\* cited by examiner

*Primary Examiner* — Amy R Hsu
(74) *Attorney, Agent, or Firm* — JCIPRNET

(57) ABSTRACT
There is provided a digital camera including: a body part; a display part; and an angle adjustment mechanism that adjusts an inclination angle of the display part with respect to a connection target surface by rotationally moving about a first rotational movement axis along one side of the body part in a direction view along a direction perpendicular to the connection target surface, in which the body part includes an accommodation portion that accommodates the display part and the angle adjustment mechanism, and a connection portion that is located in the accommodation portion and is connected to a cooling device.

12 Claims, 20 Drawing Sheets

FIG. 4

DISPLAY DEVICE AND IMAGING APPARATUS

CROSS-REFERENCE TO RELATED APPLICATIONS

This application claims priority under 35 U.S.C § 119(a) to Japanese Patent Application No. 2023-001191 filed on 6 Jan. 2023. The above application is hereby expressly incorporated by reference, in its entirety, into the present application.

BACKGROUND OF THE INVENTION

1. Field of the Invention

The present invention relates to a display device and an imaging apparatus.

2. Description of the Related Art

An imaging apparatus described in JP2020-31286A, on which a battery grip can be mounted, comprises a rear surface distance detection unit that detects that a photographer has approached a rear surface of the apparatus. The battery grip comprises a cooling fan. The imaging apparatus controls a rotational movement direction of the cooling fan and selects a heat discharge direction, according to a detection result of the rear surface distance detection unit.

An imaging apparatus described in JP2020-31285A comprises a display unit that is coupled to an imaging apparatus body to be rotationally movable around at least one axis and that displays information regarding imaging. The display unit comprises an air cooling fan that discharges air in a direction opposite to a display side.

SUMMARY OF THE INVENTION

One embodiment according to the present disclosed technology provides a display device and an imaging apparatus capable of being connected to an external cooling member and capable of being miniaturized.

According to an aspect of the present disclosed technology, there is provided a display device comprising: a body part; a display part; and an angle adjustment mechanism, in which the body part includes an accommodation portion and a connection portion. The angle adjustment mechanism adjusts an inclination angle of the display part with respect to a first surface provided on the body part by rotationally moving about a first axis along one side of the body part in a direction view along a direction perpendicular to the first surface. The accommodation portion accommodates the display part and the angle adjustment mechanism. The connection portion is located in the accommodation portion and is connected to an external cooling member.

It is preferable that the angle adjustment mechanism includes a hinge part, the hinge part includes a fixed portion that is fixed to the accommodation portion, and a first support portion that supports the display part to be rotationally movable around the first axis, and the fixed portion is coupled to the first support portion at a position on a side fixed to the accommodation portion in the direction view.

It is preferable that the first support portion includes a rotational movement restricting portion that restricts the rotational movement. It is preferable that the rotational movement restricting portion restricts the rotational movement by engaging with the fixed portion.

It is preferable that the fixed portion includes a first fixed piece that is fixed to the accommodation portion, a second fixed piece that is disposed to intersect with the first fixed piece and is coupled to the first support portion, and an engagement target portion that is formed in a first region connecting the first fixed piece and the second fixed piece, and the rotational movement restricting portion restricts a rotational movement of the first support portion by engaging with the engagement target portion. It is preferable that the engagement target portion is a recessed portion that is formed in the first region and that is recessed in a direction in which the first support portion rotationally moves.

It is preferable that, in a case where the external cooling member is connected to the connection portion, the hinge part is disposed outside of the external cooling member in the direction view.

It is preferable that, in a case where the external cooling member is connected to the connection portion, a position of at least a part of the hinge part is disposed at a position different from a position of the external cooling member in a first direction orthogonal to the first axis.

It is preferable that the hinge part includes a second support portion that supports the display part, the second support portion is coupled to the first support portion and makes the display part rotationally movable around a second axis different from the first axis, the first support portion is rotationally movable around the first axis between a first rotational movement start position and a first rotational movement end position, and the second support portion is rotationally movable around the second axis between a second rotational movement start position and a second rotational movement end position.

It is preferable that, in a case where the first support portion is at the first rotational movement end position, and the second support portion is at the second rotational movement end position, a position of the display part is located on a body part side in a first direction orthogonal to the first axis, with respect to an end surface of the body part.

It is preferable that, in a case where the first support portion is at the first rotational movement end position, and the second support portion is at the second rotational movement start position, a position of the display part is located on a body part side in a first direction orthogonal to the first axis, with respect to an end surface of the body part.

It is preferable that, in a case where the inclination angle of the display part with respect to the first surface is 45 degrees or more, the connection portion is exposed to an outside and is connectable to the external cooling member.

According to another aspect of the present disclosed technology, there is provided an imaging apparatus comprising: a body part; a lens that is attached to the body part; and the above-described display device, in which the body part is a body part of the imaging apparatus, and the first surface is a surface on a side opposite to a surface to which the lens is attached.

BRIEF DESCRIPTION OF THE DRAWINGS

FIG. 4 is a rear view of the imaging apparatus.

DESCRIPTION OF THE PREFERRED EMBODIMENTS

Schematic Configuration of Digital Camera

Figure 1:
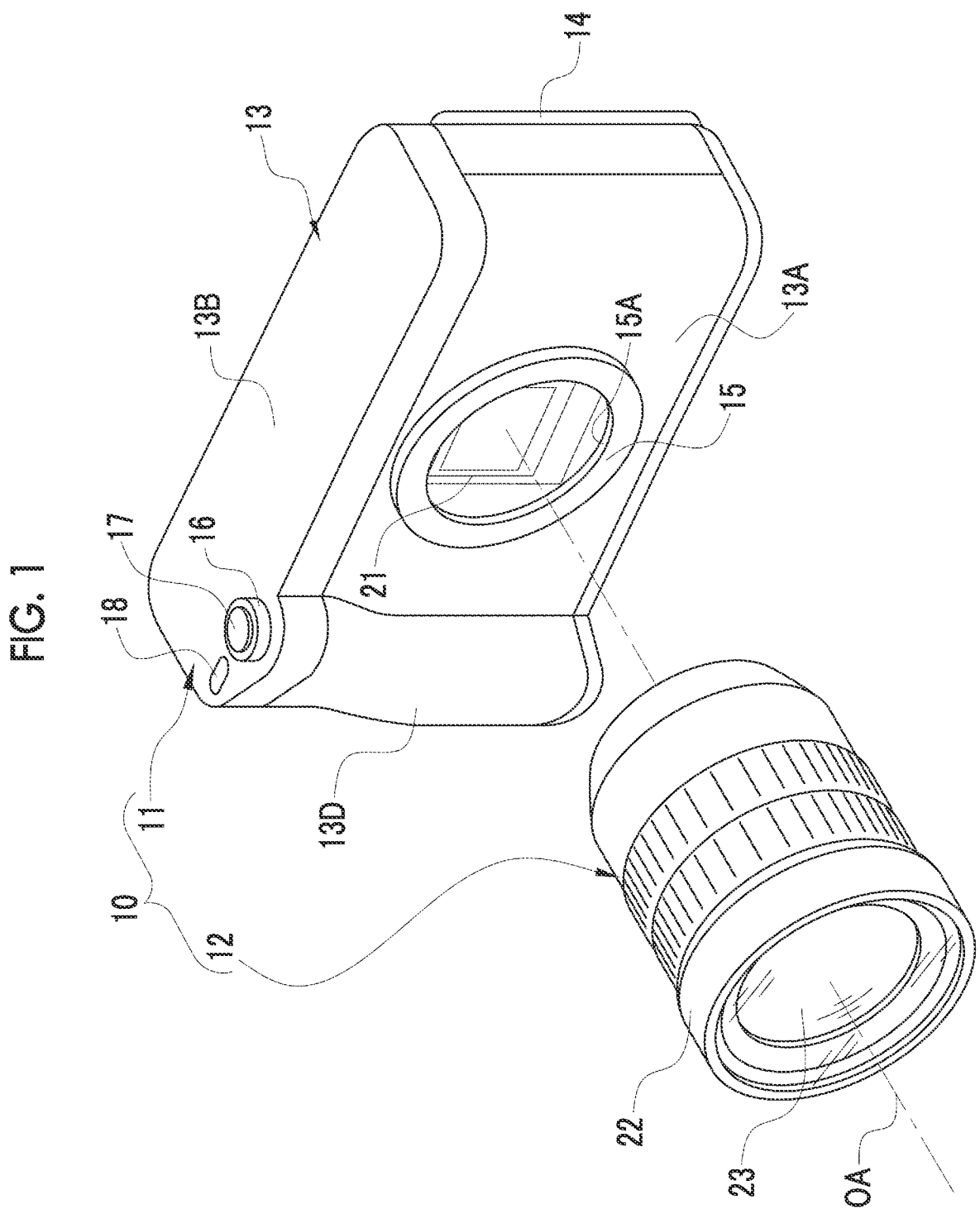
FIG. 1 is a front perspective view of an imaging apparatus.

A digital camera 10 comprises a camera body 11 and an interchangeable lens barrel 12, as shown in FIG. 1. The camera body 11 comprises a body part 13, a display unit 14, and an angle adjustment mechanism 25 (see FIGS. 3 and 7), which will be described below. A lens mount 15 is provided on a front surface 13A of the body part 13. The lens mount 15 includes a circular imaging aperture 15A. The lens barrel 12 is attachably and detachably mounted on the lens mount 15. In addition, an operation dial 16, a release switch 17, a power switch 18, and the like are provided on a top surface 13B of the body part 13. The digital camera 10 is an example of a display device and an imaging apparatus according to the present invention.

Figure 2:
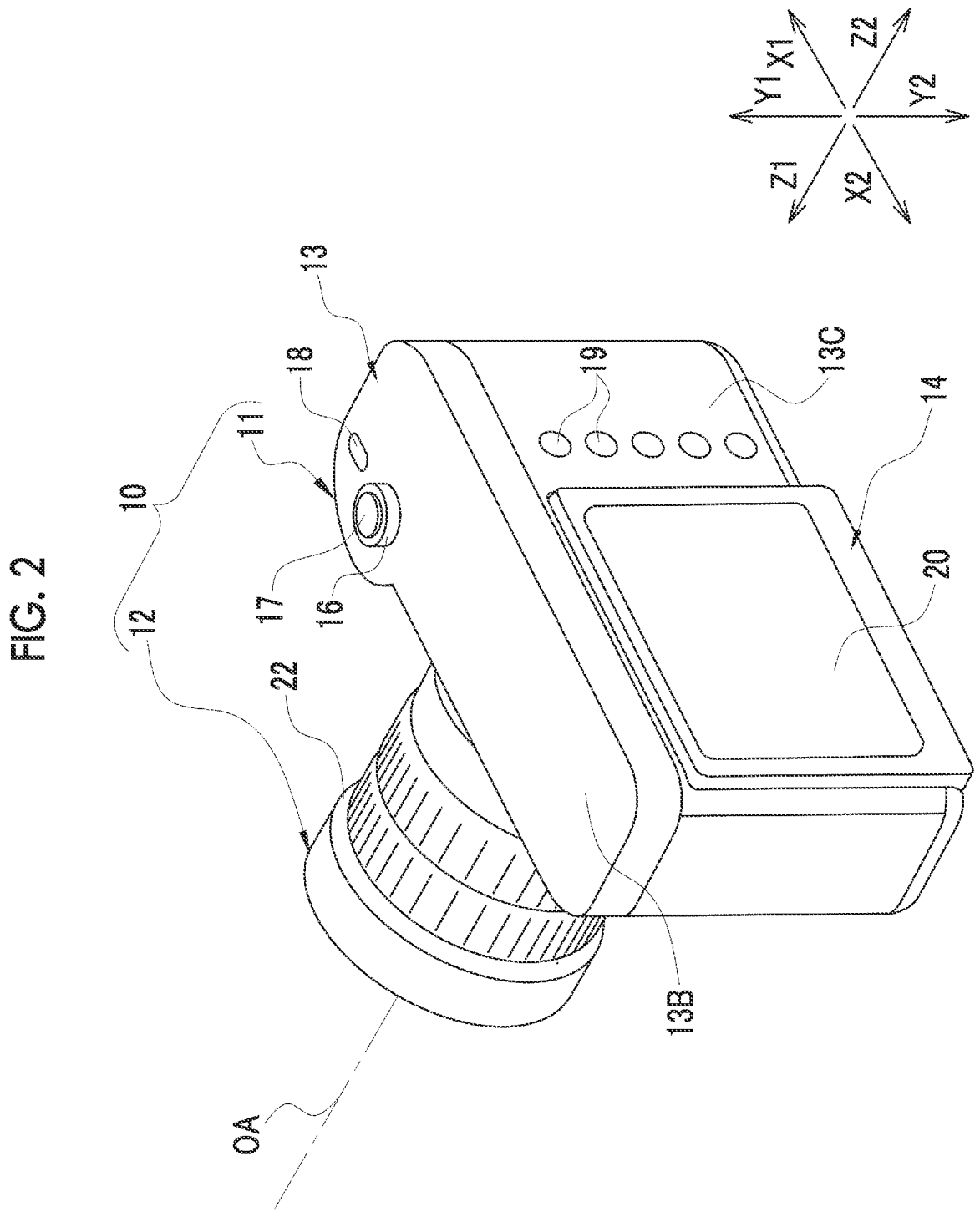
FIG. 2 is a rear perspective view of the imaging apparatus in a state in which a display unit is positioned at a closed position.

As shown in FIG. 2, the display unit 14 is disposed on a rear surface 13C of the body part 13. In addition, an operation button 19 and the like are provided on the rear surface 13C of the body part 13. The display unit 14 includes a display part 20. The display part 20 is a liquid crystal display (LCD), an organic electroluminescent display (OELD), or the like. The display part 20 is used to display a live view image, display a captured image, display a setting menu, and the like. In addition, the body part 13 includes a grip portion 13D.

An imaging element 21 is incorporated into the camera body 11. The imaging element 21 is, for example, a complementary metal-oxide semiconductor (CMOS) image sensor, a charge-coupled device (CCD) image sensor, or an organic thin film imaging element.

The lens barrel 12 comprises a lens barrel body 22, an imaging optical system 23, and the like. The lens barrel body 22 has a cylindrical shape and holds the imaging optical system 23 inside, and includes a lens mount and a lens-side signal contact (not shown) provided at a rear end thereof. The imaging optical system 23 forms an image of subject light on the imaging element 21 in a case where the lens barrel 12 is mounted on the camera body 11.

Figure 3:
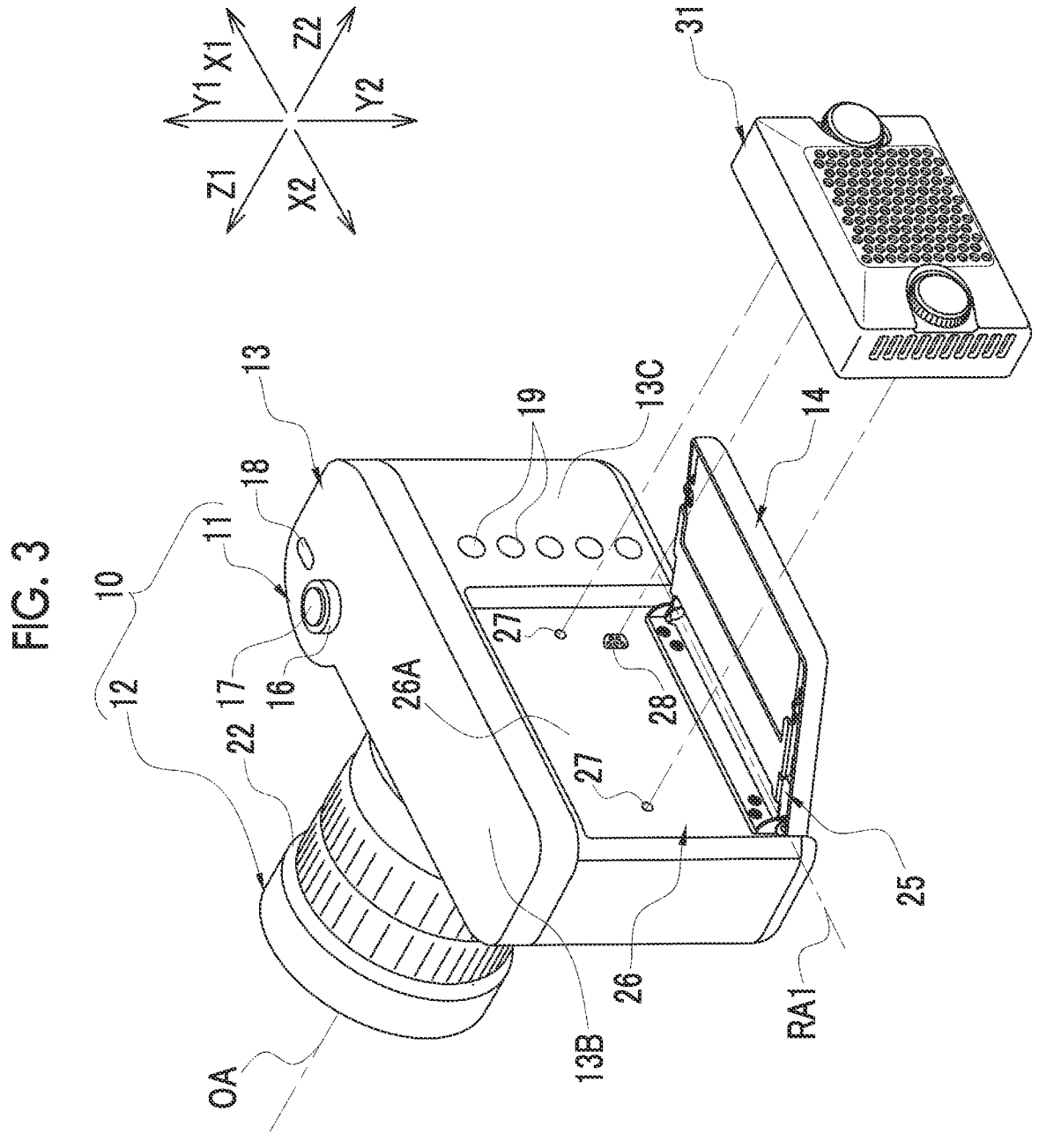
FIG. 3 is a rear perspective view of the imaging apparatus in a state in which the display unit is positioned at an opened position.

As shown in FIG. 3, the display unit 14 is attached to the body part 13 via the angle adjustment mechanism 25. The body part 13 includes an accommodation portion 26 on the rear surface 13C. The accommodation portion 26 is a rectangular recessed portion that is recessed by one step from a periphery of the body part 13. The accommodation portion 26 includes a connection target surface 26A, which will be described below. The accommodation portion 26 accommodates the display unit 14 and the angle adjustment mechanism 25 (a state shown in FIG. 2).

Figure 4:
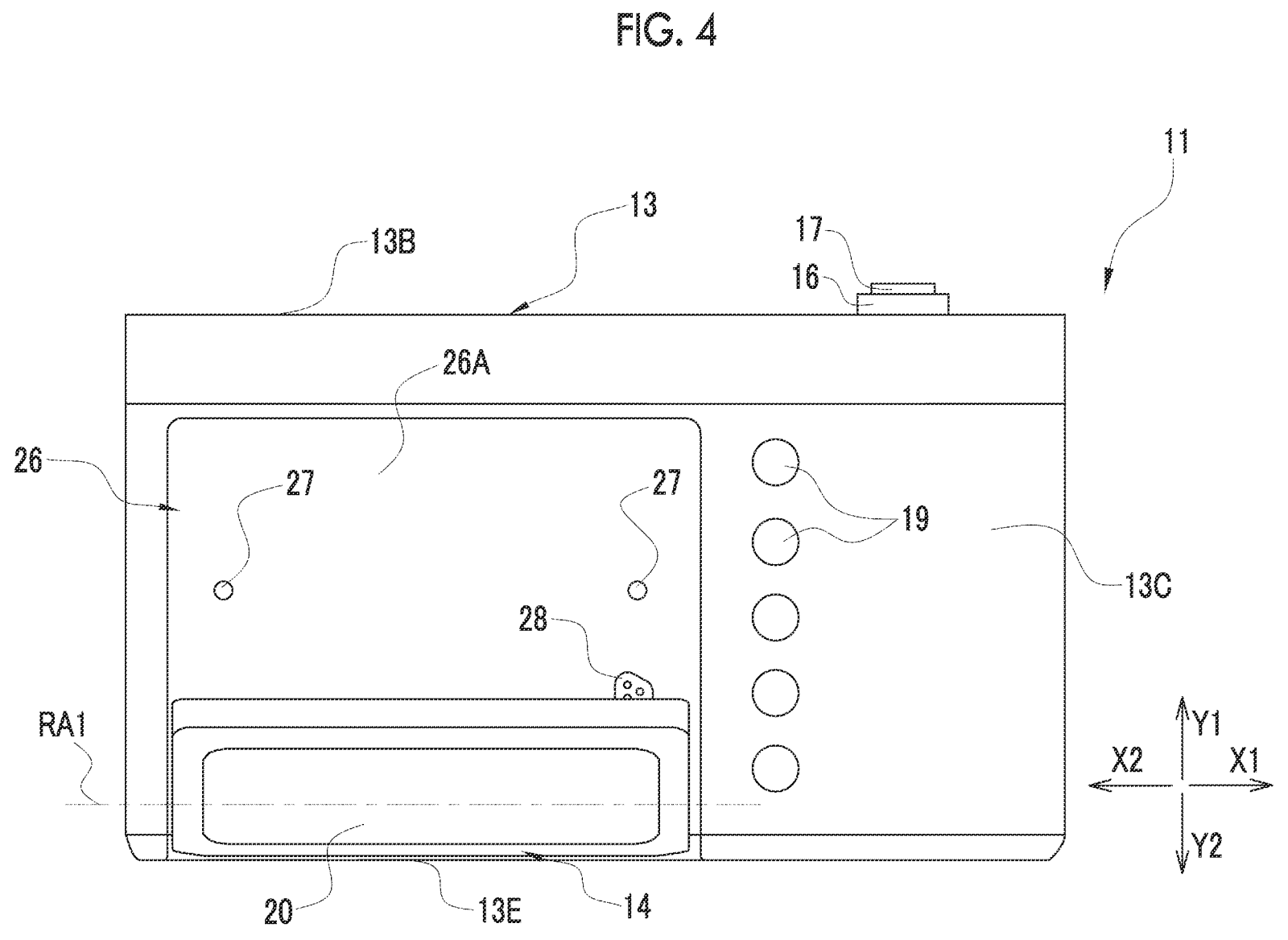

As shown in FIG. 4, the angle adjustment mechanism 25 includes a rotational movement axis RA1 along one side of the body part 13 in a direction view along a direction perpendicular to the connection target surface 26A, that is, in a case where the connection target surface 26A is viewed in a Z1 direction. The angle adjustment mechanism 25 adjusts an inclination angle of the display part 20 with respect to the connection target surface 26A by rotationally moving about the rotational movement axis RA1. The connection target surface 26A is a surface on a side opposite to the front surface 13A of the body part 13 to which the lens barrel 12 is attached.

The connection target surface 26A corresponds to a first surface within the scope of the claims. In the example shown in FIG. 4, the connection target surface 26A is a surface orthogonal to the Z1 direction, and the rotational movement axis RA1 is disposed along a bottom surface 13E which is one side of the body part 13. The rotational movement axis RA1 corresponds to a first axis within the scope of the claims.

A direction on an imaging optical system 23 side with respect to the body part 13 is the Z1 direction, and a Z2 direction is a direction on a side opposite to the Z1 direction with respect to the body part 13. In addition, Y1 and Y2 directions are directions orthogonal to the Z1 and Z2 directions, and are parallel to a top-bottom direction (up-down direction) of the body part 13 in the present embodiment. Specifically, a top surface 13B side with respect to the body part 13 is the Y1 direction, and a bottom surface 13E side is the Y2 direction. Further, X1 and X2 directions are directions orthogonal to the Z1 and Z2 directions and the Y1 and Y2 directions, and correspond to a left-right direction of the digital camera 10 in the present embodiment. Specifically, a right side with respect to the body part 13 is the X1 direction, and a left side is the X2 direction.

In the present specification, the term "orthogonal" includes not only the meaning of perfect orthogonality but also the meaning of substantial orthogonality including errors allowed in design and manufacturing. Additionally, the term "parallel" includes not only the meaning of perfect parallelism but also the meaning of substantial parallelism including errors allowed in design and manufacturing.

The angle adjustment mechanism 25 can rotationally move the display unit 14 about the rotational movement axis RA1. As a result, the angle adjustment mechanism 25 can adjust an inclination angle α1 (see FIG. 18) of the display part 20 with respect to the connection target surface 26A.

The body part 13 includes a connection portion 27 for connecting a cooling device 31, which will be described below. The connection portion 27 is located in the accommodation portion 26. Specifically, the connection portion 27 is a pair of screw holes for attachably and detachably attaching the cooling device 31, which are disposed at substantially center positions of the connection target surface 26A in the up-down direction and at symmetrical positions with respect to the center of the connection target surface 26A in the left-right direction. In addition, a power supply connector 28 for supplying power to the cooling device 31 is provided at a right end of the connection target surface 26A.

Schematic Configuration of Cooling Device

Figure 5:
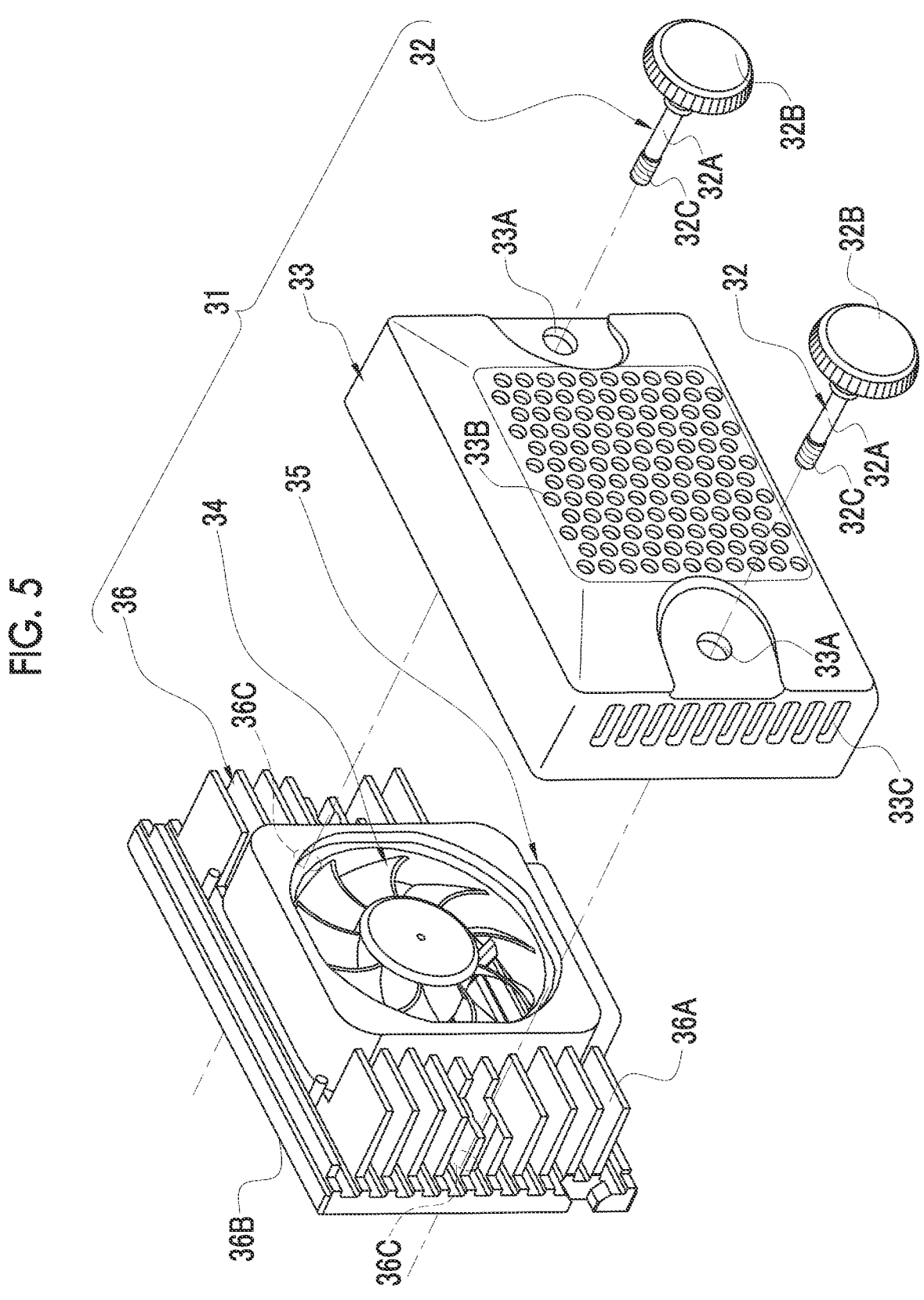
FIG. 5 is an exploded perspective view of a cooling device.
Figure 6:
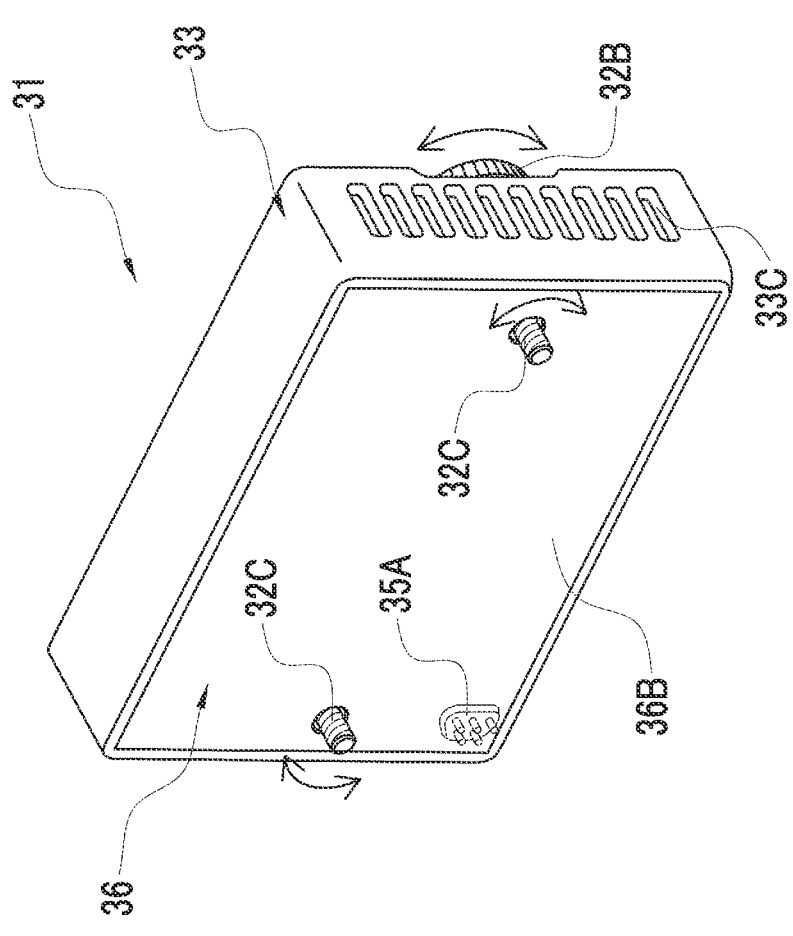
FIG. 6 is a perspective view of the cooling device from a mounting surface side.

As shown in FIGS. 5 and 6, the cooling device 31 comprises a pair of device mounting screws 32, a housing 33, a fan 34, a power receiving portion 35, and a heat sink 36. The housing 33 covers the fan 34, the power receiving portion 35, and the heat sink 36. The cooling device 31 corresponds to an external cooling member within the scope of the claims.

The device mounting screw 32 has a screw body portion 32A and a screw head portion 32B. The screw body portion 32A is formed in an elongated columnar shape. The screw head portion 32B is provided at one end of the screw body portion 32A and is formed in a disc-like shape having a diameter larger than that of the screw body portion 32A. The screw body portion 32A includes a tip thread portion 32C and is screwed with the connection portion 27 of the connection target surface 26A. Grooves for slip prevention are formed on an outer peripheral surface of the screw head portion 32B.

A pair of insertion holes 33A, an intake port 33B, and an exhaust port 33C are formed in the housing 33. The screw body portions 32A of the device mounting screws 32 are inserted into the pair of insertion holes 33A. The fan 34 is fixed to the heat sink 36 and sends cooling air to the heat sink 36. The fan 34 is an axial flow fan, and sucks air taken into the inside of the cooling device 31 from the intake port 33B and expels the air toward the heat sink 36. The expelled air is discharged to the outside from the exhaust port 33C.

The power receiving portion 35 includes a power receiving connector 35A (see FIG. 6) and a controller (not shown) and is fixed to the heat sink 36. The controller controls the drive of the fan 34 and the power supply. The power receiving connector 35A is connected to the power supply connector 28 of the connection target surface 26A in a case where the cooling device 31 is attached to the connection target surface 26A. The power receiving connector 35A receives drive power of the fan 34 from the digital camera 10 via the power supply connector 28.

A plurality of fins 36A for heat dissipation, a mounting surface 36B, and a pair of insertion holes 36C are formed in the heat sink 36. The fins 36A are disposed on one surface side of the heat sink 36. The mounting surface 36B is located on a side opposite to a surface on which the fins 36A are formed. The mounting surface 36B comes into contact with the connection target surface 26A in a case where the cooling device 31 is attached. The screw body portion 32A of the device mounting screw 32 is inserted into the insertion hole 36C. The housing 33 and the heat sink 36 are joined together, for example, by screwing. As a result, the housing 33, the fan 34, the power receiving portion 35, and the heat sink 36 are integrated.

As described above, the screw body portion 32A of the device mounting screw 32 is inserted into the insertion holes 33A and 36C and is screwed with the connection portion 27 of the connection target surface 26A, with the tip thread portion 32C protruding from the mounting surface 36B. As a result, the cooling device 31 is connected to the connection target surface 26A.

Configuration of Angle Adjustment Mechanism

Figure 7:
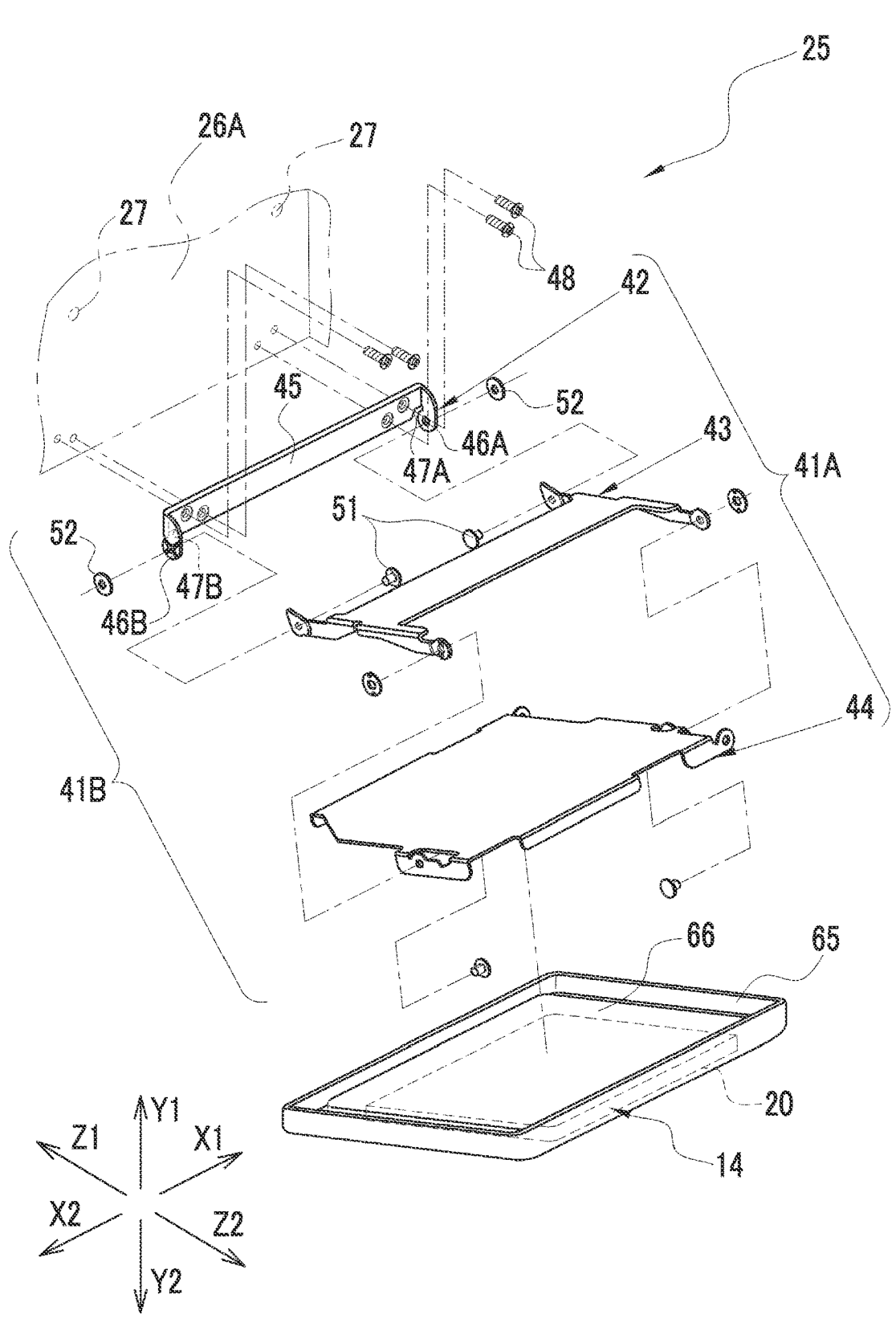
FIG. 7 is an exploded perspective view of an angle adjustment mechanism.

As shown in FIG. 7, the angle adjustment mechanism 25 includes a pair of hinge parts 41A and 41B. In the present embodiment, the pair of hinge parts 41A and 41B are located on the right side (X1 direction side) and the left side (X2 direction side) with respect to the display unit 14, respectively. In addition, the pair of hinge parts 41A and 41B share some configurations.

Configuration of Hinge Part

The hinge part 41A comprises a fixed portion 42, a first support portion 43, and a second support portion 44. Hereinafter, a configuration of any one of the hinge part 41A or 41B will be mainly described, and in a case where one configuration is the same as the other configuration, the description of the other configuration will be omitted.

Configuration of Fixed Portion

The fixed portion 42 includes a first fixed piece 45, second fixed pieces 46A and 46B, and engagement target portions 47A and 47B. The fixed portion 42 is made of metal, such as stainless steel. The hinge part 41A and the hinge part 41B share a configuration of the first fixed piece 45. Therefore, the second fixed piece 46A and the engagement target portion 47A are disposed at a right-side end part of the first fixed piece 45, and the second fixed piece 46B and the engagement target portion 47B are disposed at a left-side end part. The second fixed piece 46A and the engagement target portion 47A are provided in the hinge part 41A, and the second fixed piece 46B and the engagement target portion 47B are provided in the hinge part 41B.

The first fixed piece 45 is fixed to the accommodation portion 26 by being screwed to the accommodation portion 26, for example, by a screw member 48. The first fixed piece 45 is formed in a plate-like shape extending in the X1 and X2 directions.

The second fixed piece 46A is disposed to intersect with the first fixed piece 45. Specifically, the second fixed piece 46A is bent and connected in the Z2 direction from the right-side end part of the first fixed piece 45. Meanwhile, the second fixed piece 46B is bent and connected in the Z2 direction from the left-side end part of the first fixed piece.

Figure 8:
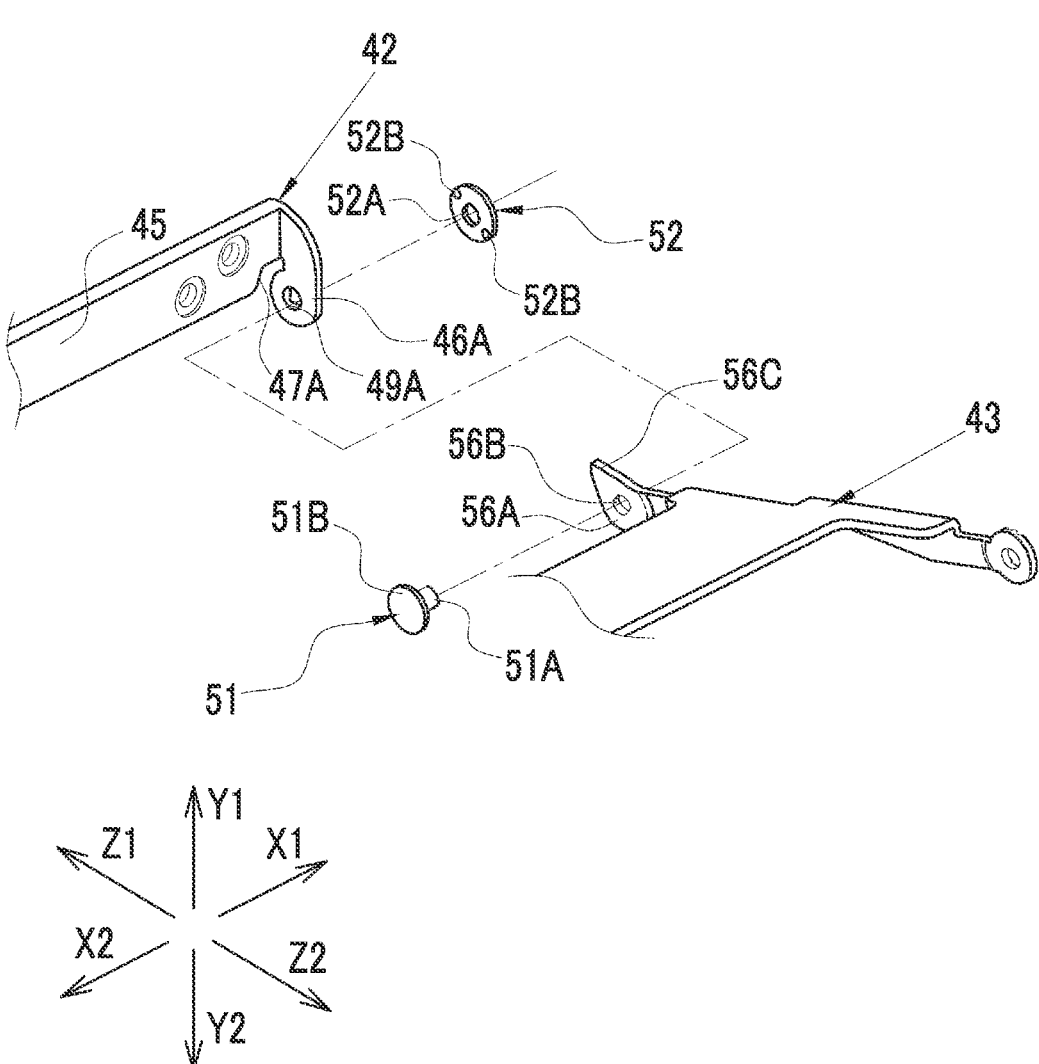
FIG. 8 is a perspective view of a periphery of a coupling part between a fixed portion and a first support portion.
Figure 9:
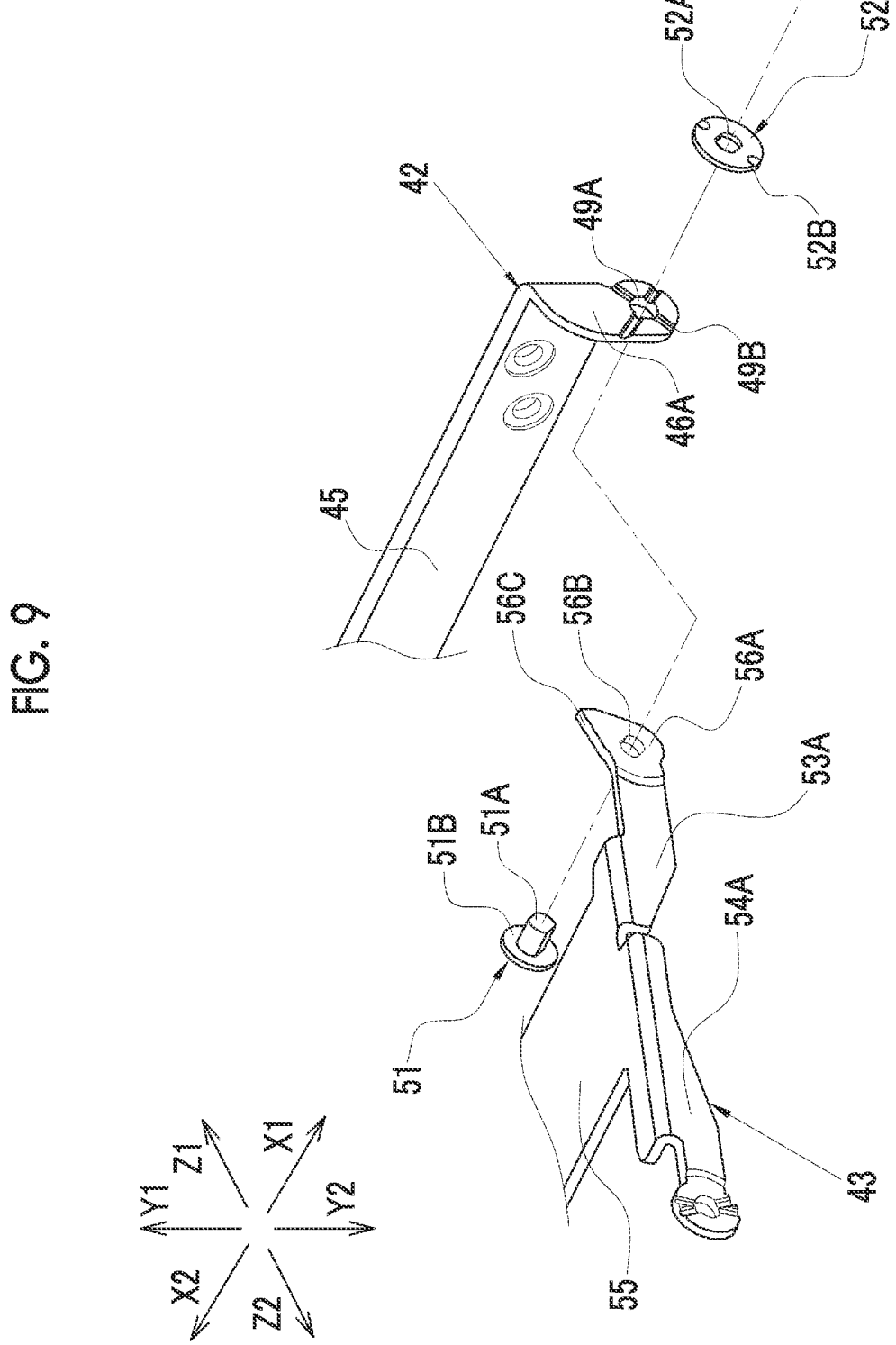
FIG. 9 is a perspective view of the periphery of the coupling part between the fixed portion and the first support portion as viewed in another direction.

As shown in FIGS. 8 and 9, the second fixed pieces 46A and 46B are coupled to the first support portion 43. The second fixed piece 46A includes an insertion hole 49A and a plurality of click grooves 49B. The first support portion 43 includes an insertion hole 56B, which will be described below.

The second fixed piece 46A and the first support portion 43 are coupled to each other via a coupling pin 51 and a click plate 52. The click plate 52 includes an engaging hole 52A and click protrusion portions 52B. The coupling pin 51 includes a shaft portion 51A and a disc portion 51B. The shaft portion 51A is formed in a columnar shape and is inserted into the insertion hole 49A and the insertion hole 56B. The disc portion 51B is provided at one end of the shaft portion 51A and is formed in a disc-like shape having a diameter larger than that of the shaft portion 51A. The click plate 52 is integrated with the coupling pin 51 through engagement between the engaging hole 52A and the shaft portion 51A. As a result, the second fixed piece 46A and the first support portion 43 are coupled to each other. Similarly, the second fixed piece 46B and the first support portion 43 are also coupled to each other via the coupling pin 51 and the click plate 52.

The insertion hole 49A, the insertion hole 56B, the coupling pin 51, and the click plate 52 are disposed to be aligned with the above-described rotational movement axis RA1. Therefore, the first support portion 43 is rotationally movable around the rotational movement axis RA1 with respect to the fixed portion 42 by being coupled to the fixed portion 42 via the coupling pin 51 and the click plate 52.

Further, the click protrusion portions 52B of the click plate 52 and the click grooves 49B of the second fixed piece 46A are fitted to each other, whereby the first support portion 43 stops at a first rotational movement start position and a first rotational movement end position with respect to the fixed portion 42, and at positions excluding the first rotational movement start position and the first rotational movement end position, the click protrusion portions 52B disengage from the click grooves 49B to allow for the rotational movement. The first rotational movement start position and the first rotational movement end position where the first support portion 43 stops with respect to the fixed portion 42 will be described below.

Figure 10:
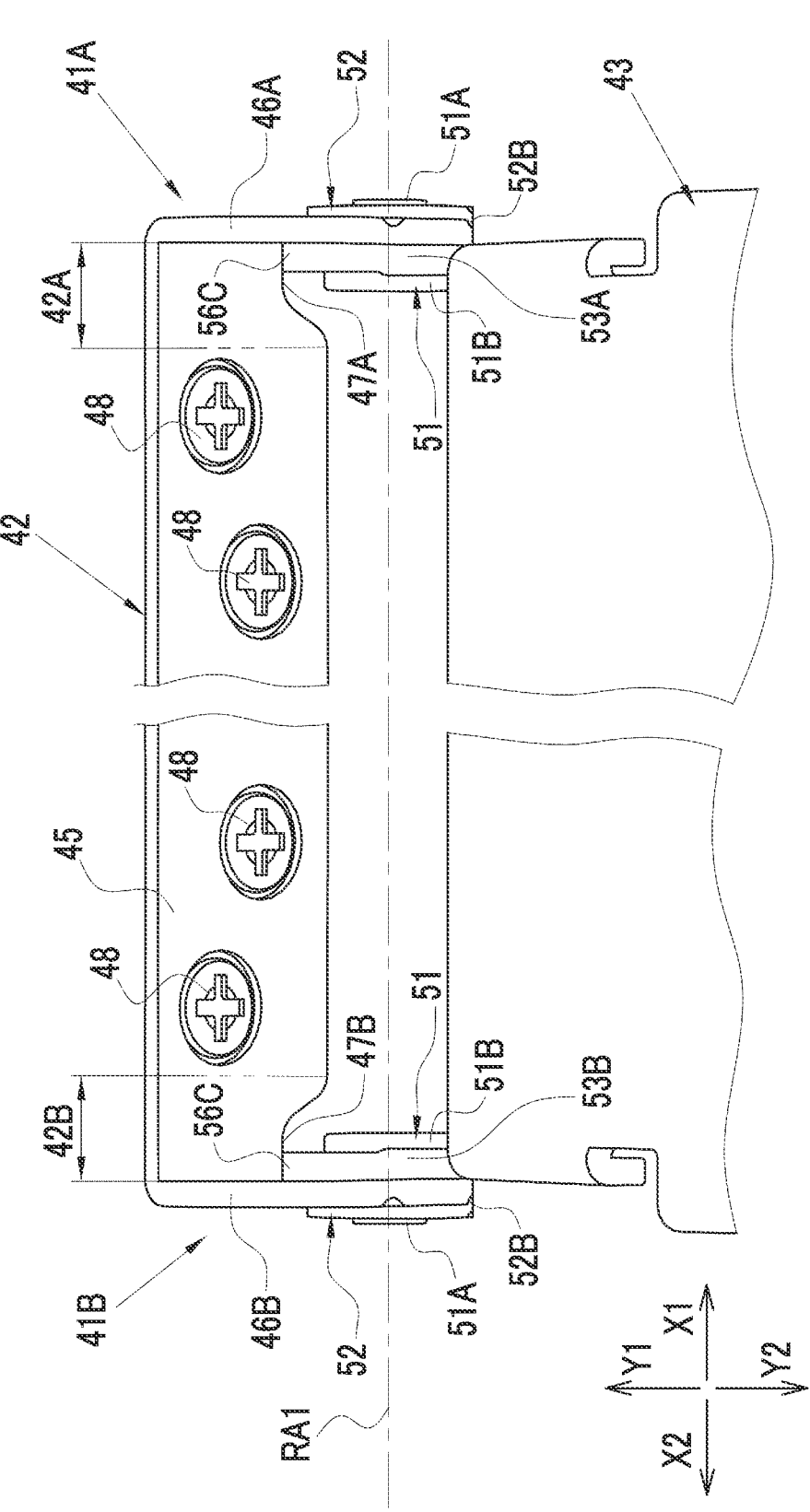
FIG. 10 is a rear view of the periphery of the coupling part between the fixed portion and the first support portion.
Figure 11:
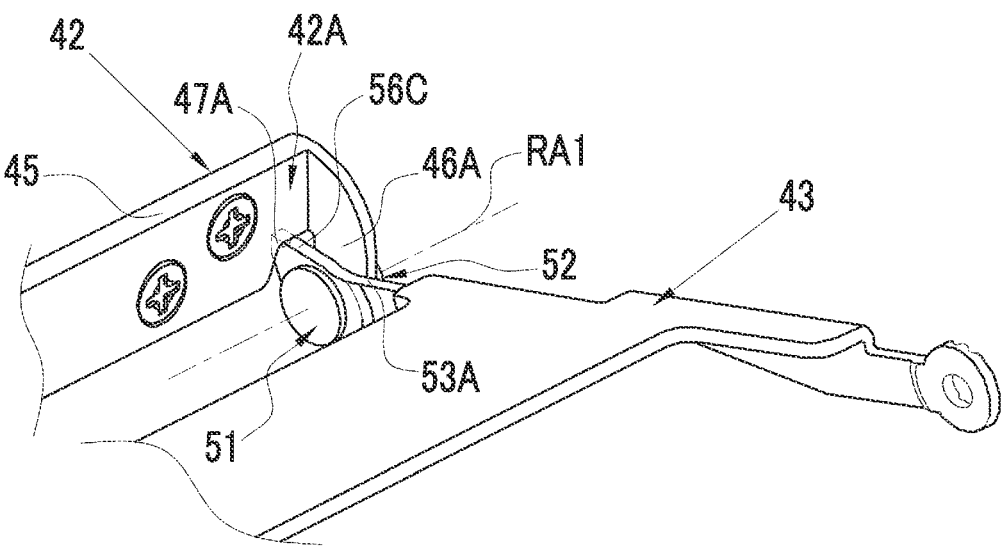
FIG. 11 is a perspective view showing a state in which the fixed portion and the first support portion are coupled to each other and a state in which a rotational movement is restricted by a rotational movement restricting portion.
Figure 11:
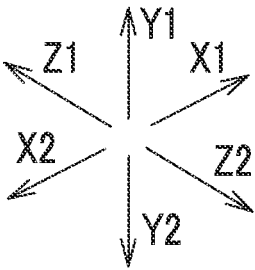

As shown in FIGS. 10 and 11, the engagement target portion 47A is formed in a first region 42A connecting the first fixed piece 45 and the second fixed piece 46A in the fixed portion 42. In the present embodiment, the first region 42A is a position where the right-side end part of the first fixed piece 45 and the second fixed piece 46A are in contact with each other. The engagement target portion 47A is a recessed portion recessed in a rotational movement direction in which the first support portion 43 rotationally moves, specifically, in a rotational movement direction with the rotational movement axis RA1 as the center. The engagement target portion 47A engages with a rotational movement restricting portion 56C of the first support portion 43, which will be described below. As a result, the engagement target portion 47A reliably engages with the rotational movement restricting portion 56C, so that it is possible to reliably stop the rotational movement of the first support portion 43.

The engagement target portion 47B is formed at a position on a side opposite to the engagement target portion 47A, that is, in a first region 42B connecting the first fixed piece 45 and the second fixed piece 46B in the fixed portion 42. The engagement target portion 47B engages with the rotational movement restricting portion 56C of the first support portion 43, in the same manner as the engagement target portion 47A.

Configuration of First Support Portion

Figure 12:
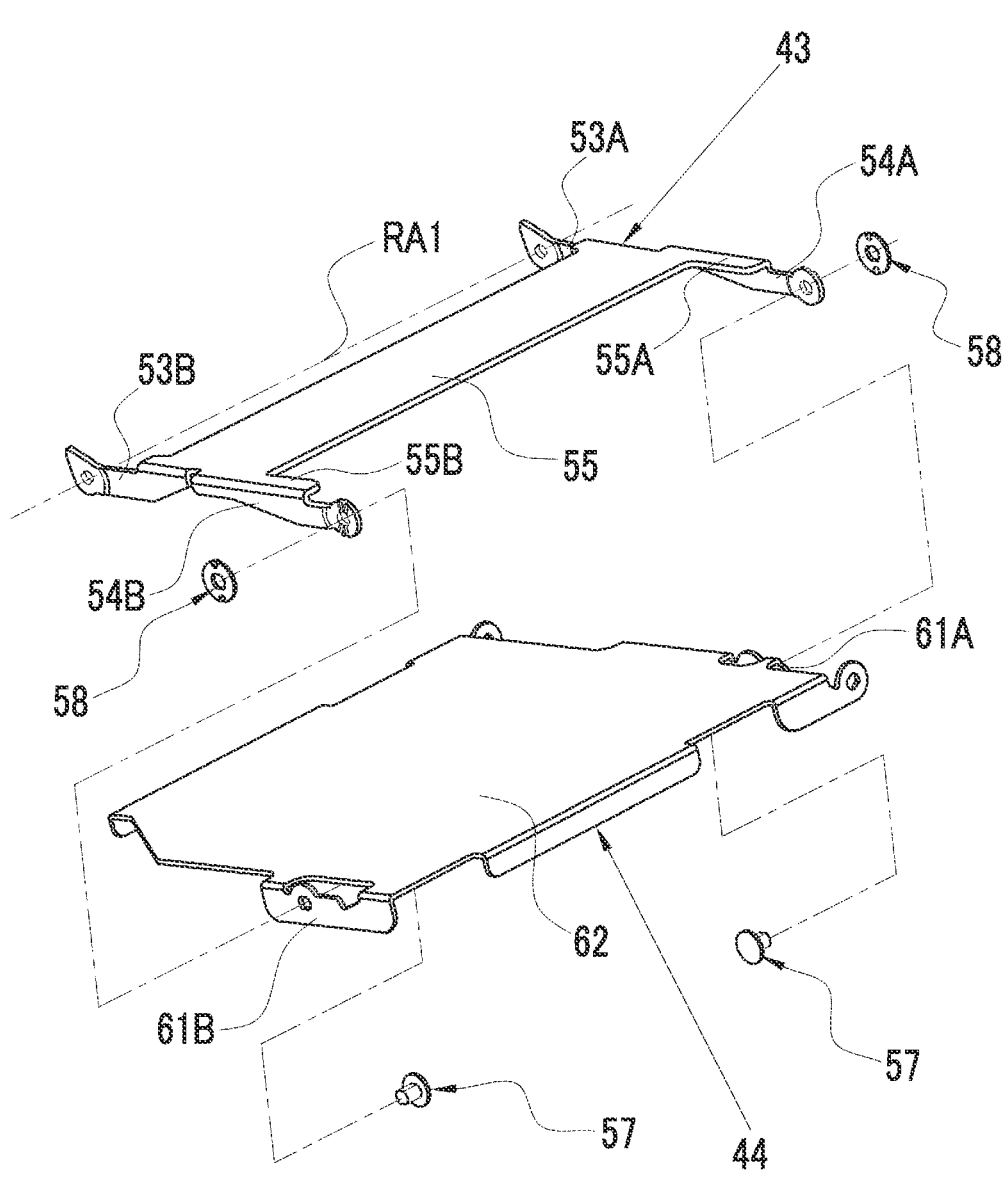
FIG. 12 is a perspective view of the first support portion and a second support portion.
Figure 12:
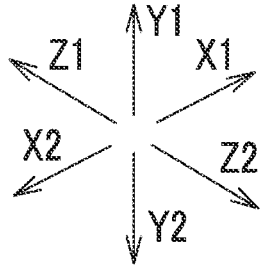

As shown in FIG. 12, the first support portion 43 includes body part-side support pieces 53A and 53B, display-side support pieces 54A and 54B, and a first intermediate part 55. The hinge part 41A and the hinge part 41B share a configuration of the first intermediate part 55. Therefore, the body part-side support piece 53A and the display-side support piece 54A are disposed on a right-side end part of the first intermediate part 55, and the body part-side support piece 53B and the display-side support piece 54B are disposed on a left-side end part. The body part-side support piece 53A and the display-side support piece 54A are provided in the hinge part 41A, and the body part-side support piece 53B and the display-side support piece 54B are provided in the hinge part 41B.

The first intermediate part 55 is formed in a plate-like shape extending in the X1 and X2 directions. The body part-side support pieces 53A and 53B are bent with respect to the first intermediate part 55. In a case where the fixed portion 42 and the first support portion 43 are coupled to each other, the body part-side support pieces 53A and 53B extend in a direction orthogonal to the rotational movement axis RA1.

Configuration of Body Part-Side Support Piece

As shown in FIG. 9, the body part-side support piece 53A includes a coupling pin receiving portion 56A, the insertion hole 56B, and the rotational movement restricting portion 56C. The coupling pin receiving portion 56A is formed in a disc-like shape having substantially the same diameter as an outer diameter of the disc portion 51B of the above-described coupling pin 51 and comes into contact with the coupling pin 51. The insertion hole 56B is located at the center of the coupling pin receiving portion 56A, and the shaft portion 51A of the coupling pin 51 is inserted into the insertion hole 56B. As described above, the body part-side support piece 53A is coupled to the second fixed piece 46A of the fixed portion 42 via the coupling pin 51 and the click plate 52.

The rotational movement restricting portion 56C is a protruding portion that protrudes from an outer periphery of the coupling pin receiving portion 56A. The rotational movement restricting portion 56C is disposed to be aligned with the first region 42A of the fixed portion 42. As a result, in a case where the first support portion 43 is rotationally moved with respect to the fixed portion 42, the rotational movement restricting portion 56C restricts the rotational movement of the first support portion 43 by engaging with the engagement target portion 47A (a state shown in FIGS. 10 and 11).

Figure 13:
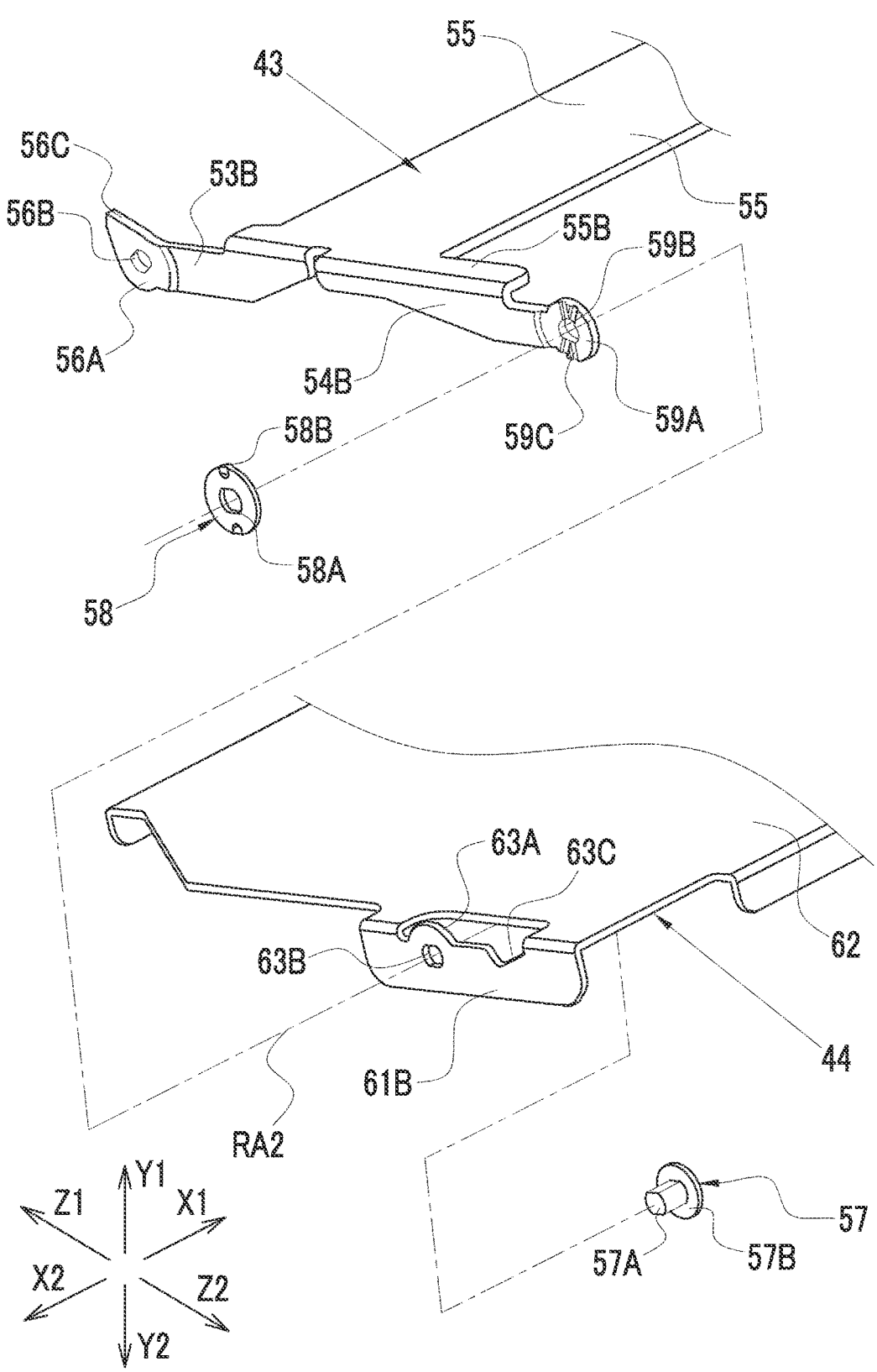
FIG. 13 is a perspective view of a periphery of a coupling part between the first support portion and the second support portion.

As shown in FIG. 13, the body part-side support piece 53B also includes the coupling pin receiving portion 56A, the insertion hole 56B, and the rotational movement restricting portion 56C. Therefore, the body part-side support piece 53B is coupled to the second fixed piece 46B of the fixed portion 42 via the coupling pin 51 and the click plate 52, in the same manner as the body part-side support piece 53A. Further, the rotational movement restricting portion 56C of the body part-side support piece 53B is disposed to be aligned with the first region 42B of the fixed portion 42. As a result, the rotational movement restricting portion 56C restricts the rotational movement of the first support portion 43 by engaging with the engagement target portion 47B.

As described above, in a case where the body part-side support piece 53A and the second fixed piece 46A, and the body part-side support piece 53B and the second fixed piece 46B are coupled to each other, the fixed portion 42 is coupled to the first support portion 43 at a position on a side where the fixed portion 42 is fixed to the accommodation portion 26 in a case where the connection target surface 26A is viewed in the Z1 direction. That is, the fixed portion 42 is coupled to the first support portion 43 on the X2 direction side with respect to the second fixed piece 46A and on the X1 direction side with respect to the second fixed piece 46B (see FIG. 10).

Figure 14:
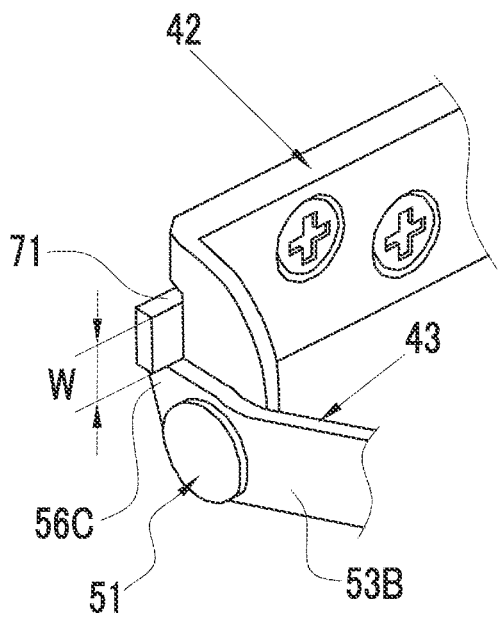
FIG. 14 is a perspective view showing a configuration to be compared with the present invention.

As shown in FIG. 14, in a case where the fixed portion 42 is coupled to the first support portion 43 at a position on the outside of the fixed portion 42 (on a side opposite to a side where the fixed portion 42 is fixed to the accommodation portion 26), a protrusion portion 71 that engages with the rotational movement restricting portion 56C has to be provided on the outside of the fixed portion 42 in order to restrict the rotational movement of the first support portion 43. In this case, in order to increase an angle (the inclination angle of the display part 20) at which the first support portion 43 rotationally moves in an opening direction, a width W of the protrusion portion 71 needs to be reduced, which poses a problem in terms of strength and precision. This is because there is no margin in dimensions since the protrusion portion 71 is formed in a direction opposite to a side where the fixed portion 42 is fixed.

On the other hand, since the fixed portion 42 is coupled to the first support portion 43 at a position on a side where the fixed portion 42 is fixed to the accommodation portion 26 in a case where the connection target surface 26A is viewed in the Z1 direction, the rotational movement of the first support portion 43 can be restricted without the need to provide the protrusion portion 71, and a sufficient angle at which the first support portion 43 rotationally moves in the opening direction can be taken.

Configuration of Display-Side Support Piece

The display-side support pieces 54A and 54B are bent with respect to the first intermediate part 55. In a case where the fixed portion 42 and the first support portion 43 are coupled to each other, the display-side support pieces 54A and 54B extend in a direction orthogonal to the rotational movement axis RA1.

The first support portion 43 and the second support portion 44 are coupled to each other via a coupling pin 57 and a click plate 58. The coupling pin 57 has the same configuration as the coupling pin 51 described above, and the click plate 58 has the same configuration as the click plate 52 described above.

The display-side support piece 54B includes a coupling pin receiving portion 59A, an insertion hole 59B, and a plurality of click grooves 59C. The second support portion 44 includes an insertion hole 63B, which will be described below. The coupling pin 57 has a shaft portion 57A and a disc portion 57B. The shaft portion 57A is inserted into the insertion hole 59B and the insertion hole 63B. The click plate 58 is integrated with the coupling pin 57 through engagement between an engaging hole 58A and the shaft portion 57A. As a result, the display-side support piece 54B and the second support portion 44 are coupled to each other. The display-side support piece 54A is also coupled to the second support portion 44 via the coupling pin 57 and the click plate 58, in the same manner as the display-side support piece 54B. As a result, the second support portion 44 is coupled to the first support portion 43 and is rotationally movable around a rotational movement axis RA2 different from the rotational movement axis RA1 (see FIGS. 15 and 16). The rotational movement axis RA2 is an axis parallel to the rotational movement axis RA1 and corresponds to a second axis within the scope of the claims.

Further, click protrusion portions 58B of the click plate 58 and the click grooves 59C of the display-side support piece 54A are fitted to each other, whereby the second support portion 44 stops at a second rotational movement start position and a second rotational movement end position with respect to the first support portion 43, and at positions excluding the second rotational movement start position and the second rotational movement end position, the click protrusion portions 58B disengage from the click grooves 59C to allow for the rotational movement. The second rotational movement start position and the second rotational movement end position where the second support portion 44 stops with respect to the first support portion 43 will be described below.

The first intermediate part 55 includes rotational movement restricting portions 55A and 55B. The rotational movement restricting portions 55A and 55B extend along the display-side support pieces 54A and 54B. The rotational movement restricting portion 55A is located on the inside (X2 direction side) of the display-side support piece 54A, and the rotational movement restricting portion 55B is located on the inside (X1 direction side) of the display-side support piece 54B. The rotational movement restricting portions 55A and 55B come into contact with a second intermediate part 62 of the second support portion 44 or engage with engagement target portions 63C (see FIG. 13) of the second support portion 44 to restrict the rotational movement of the second support portion 44.

Configuration of Second Support Portion

As shown in FIG. 12, the second support portion 44 includes support pieces 61A and 61B, and the second intermediate part 62. The hinge part 41A and the hinge part 41B share a configuration of the second intermediate part 62. Therefore, the support piece 61A is disposed at a right-side end part of the second intermediate part 62, and the support piece 61B is disposed at a left-side end part. The support piece 61A is provided in the hinge part 41A, and the support piece 61B is provided in the hinge part 41B. The second intermediate part 62 is formed in a plate-like shape extending in the X1 and X2 directions. The support pieces 61A and 61B are bent with respect to the second intermediate part 62.

As shown in FIG. 13, the support piece 61B includes a coupling pin receiving portion 63A, the insertion hole 63B, and the engagement target portion 63C. The coupling pin receiving portion 63A is formed in a disc-like shape having substantially the same diameter as an outer diameter of the disc portion 57B of the coupling pin 57 and comes into contact with the coupling pin 57. The insertion hole 63B is located at the center of the coupling pin receiving portion 63A, and the shaft portion 57A of the coupling pin 57 is inserted into the insertion hole 63B. Therefore, the support piece 61B is coupled to the display-side support piece 54B of the first support portion 43 via the coupling pin 57 and the click plate 58. The support piece 61A also includes the coupling pin receiving portion 63A and the insertion hole 63B and is coupled to the display-side support piece 54A of the first support portion 43 via the coupling pin 57 and the click plate 58, in the same manner as the support piece 61B.

The engagement target portion 63C is a recessed portion recessed in a rotational movement direction in which the second support portion 44 rotationally moves, specifically, in a rotational movement direction with the rotational movement axis RA2 as the center. The support piece 61B including the engagement target portion 63C is located on the inside (X1 direction side) of the above-described display-side support piece 54B. Therefore, the engagement target portion 63C engages with the rotational movement restricting portion 55B of the first support portion 43 described above. As a result, in a case where the second support portion 44 is rotationally moved with respect to the first support portion 43, the rotational movement restricting portion 55B restricts the rotational movement of the second support portion 44 by engaging with the engagement target portion 63C (a state shown in FIG. 16).

The engagement target portion 63C may be formed at a position on a side opposite to the support piece 61B, that is, at the support piece 61A. In this case, the engagement target portion 63C at the support piece 61A engages with the rotational movement restricting portion 55A of the first support portion 43.

The second support portion 44 supports the display unit 14. The display unit 14 comprises a display case 65, a support member 66 (see FIG. 7), a substrate (not shown), and the like, in addition to the display part 20. The display case 65 covers the hinge parts 41A and 41B of the angle adjustment mechanism 25. The display unit 14 may be fixed to the second support portion 44 or coupled to be rotationally movable around an axis different from the rotational movement axes RA1 and RA2.

Operations of First Support Portion and Second Support Portion

As described above, the first support portion 43 is rotationally movable around the rotational movement axis RA1 with respect to the fixed portion 42, and the second support portion 44 is rotationally movable around the rotational movement axis RA2. Therefore, the second support portion 44 supports the display unit 14, whereby the first support portion 43 supports the display unit 14 to be rotationally movable around the rotational movement axis RA1, and the second support portion 44 supports the display unit 14 to be rotationally movable around the rotational movement axis RA2.

Figure 15:
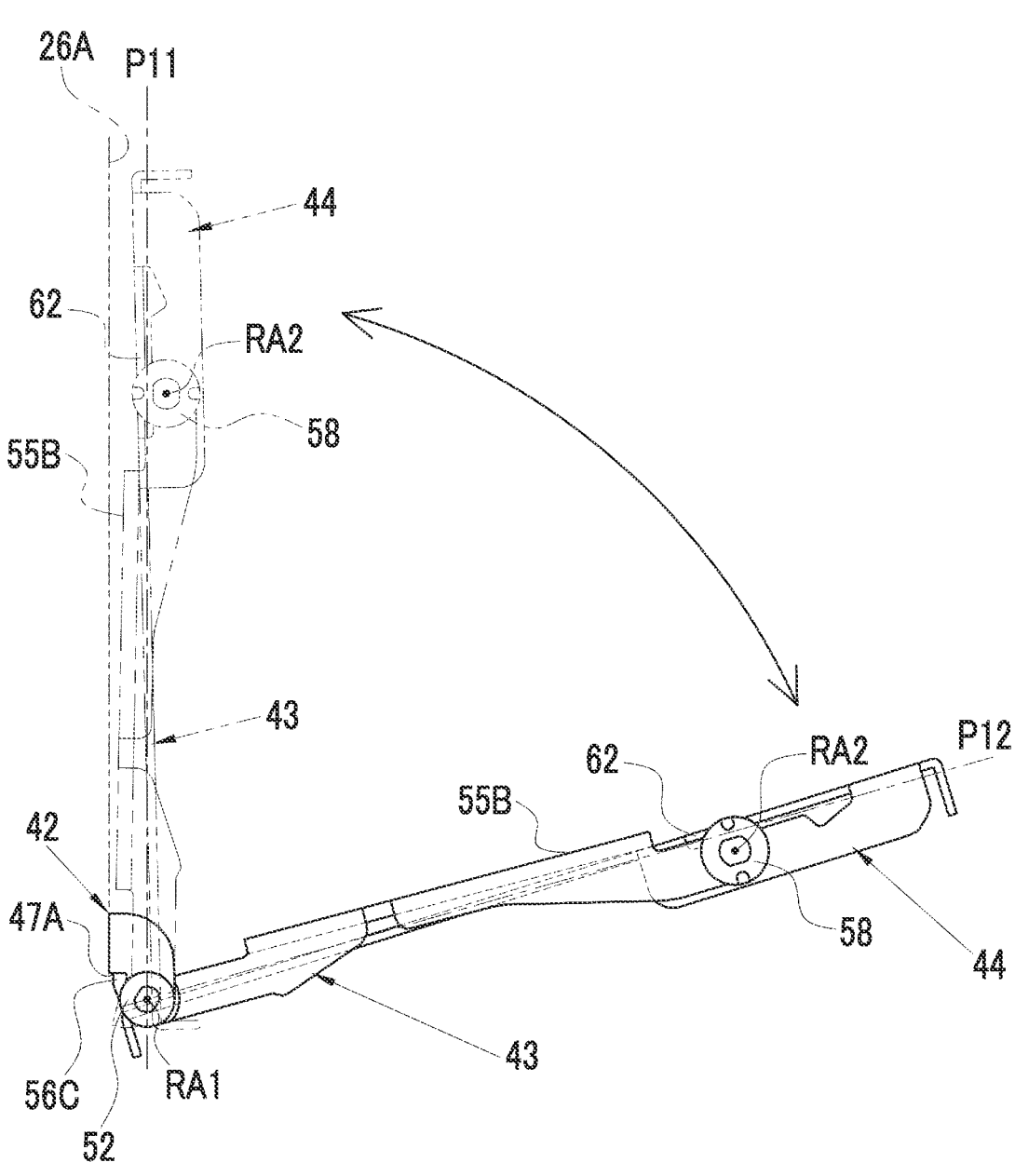
FIG. 15 is an explanatory view illustrating operations of the first support portion and the second support portion and is an explanatory view illustrating an operation in which the first support portion rotationally moves from a first rotational movement start position to a first rotational movement end position.

As shown in FIG. 15, the first support portion 43 is rotationally movable around the rotational movement axis RA1 between a first rotational movement start position P11 (a position indicated by an alternate long and two short dashes line) and a first rotational movement end position P12 (a position indicated by a solid line). The first rotational movement start position P11 is a case where the display unit 14 is at a closed position where the display unit 14 is accommodated in the accommodation portion 26, and the first support portion 43 is disposed substantially parallel to the connection target surface 26A. In addition, in the example shown in FIG. 15, the second intermediate part 62 of the second support portion 44 is in contact with the rotational movement restricting portions 55A and 55B of the first support portion 43. Further, in this case, the click protrusion portions 52B of the click plate 52 and the click grooves 49B of the second fixed piece 46A are fitted to each other, whereby the first support portion 43 stops at the first rotational movement start position P11 with respect to the fixed portion 42.

In a case where the first support portion 43 is rotationally moved from the first rotational movement start position P11 in the opening direction (a direction in which the accommodation portion 26 is exposed), the rotational movement restricting portions 56C engage with the engagement target portions 47A and 47B and the rotational movement is restricted. That is, the first support portion 43 stops at the first rotational movement end position P12. Further, in this case, the click protrusion portions 52B of the click plate 52 and the click grooves 49B of the second fixed piece 46A are fitted to each other, whereby the first support portion 43 reliably stops at the first rotational movement end position P12 with respect to the fixed portion 42.

Figure 16:
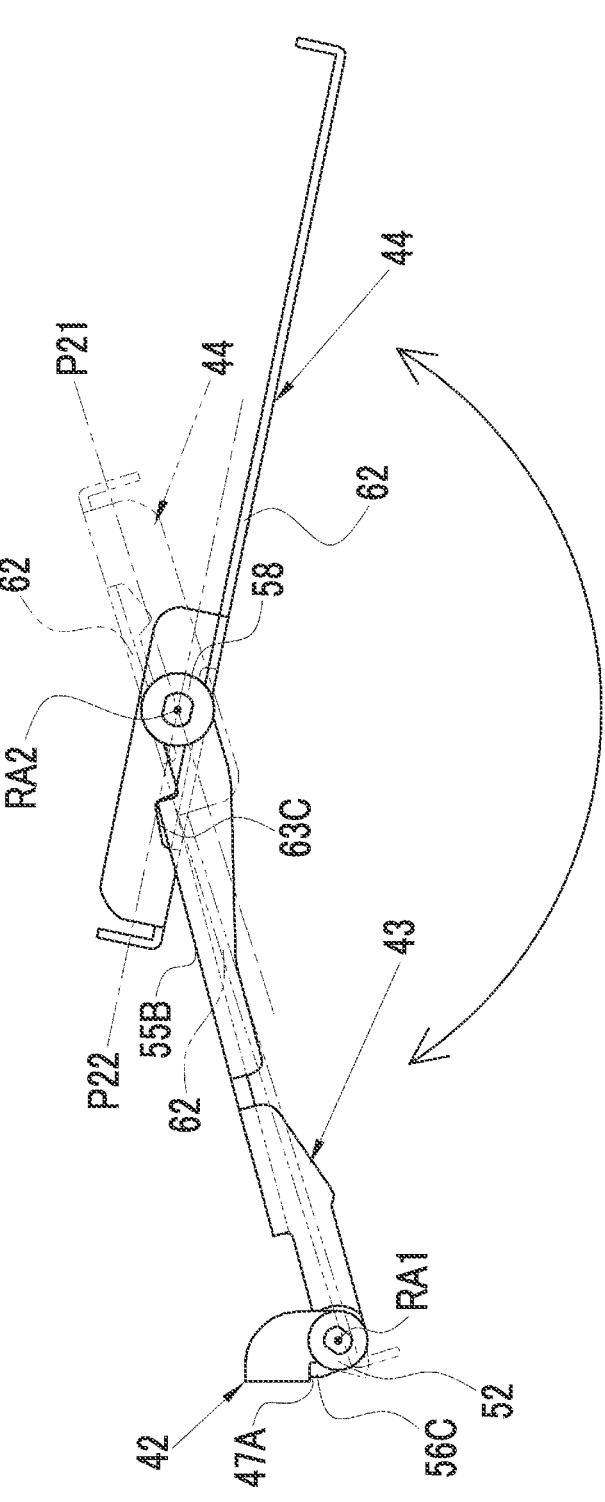
FIG. 16 is an explanatory view illustrating operations of the first support portion and the second support portion and is an explanatory view illustrating an operation in which the second support portion rotationally moves from a second rotational movement start position to a second rotational movement end position.

As shown in FIG. 16, the second support portion 44 is rotationally movable around the rotational movement axis RA2 between a second rotational movement start position P21 (a position indicated by an alternate long and two short dashes line) and a second rotational movement end position P22 (a position indicated by a solid line). At the second rotational movement start position P21, the second intermediate part 62 of the second support portion 44 is in contact with the rotational movement restricting portions 55A and 55B of the first support portion 43. In addition, in this case, in a case where the click protrusion portions 58B of the click plates 58 and the click grooves 59C of the display-side support pieces 54A and 54B are fitted to each other, the second support portion 44 stops at the second rotational movement start position P21 with respect to the first support portion 43.

In a case where the second support portion 44 rotationally moves in an upper direction (a direction in which the display part 20 faces the top surface 13B side) from the second rotational movement start position P21, the rotational movement restricting portions 55A and 55B engage with the engagement target portions 63C and the rotational movement is restricted. That is, the second support portion 44 stops at the second rotational movement end position P22. Further, in this case, in a case where the click protrusion portions 58B of the click plates 58 and the click grooves 59C of the display-side support pieces 54A and 54B are fitted to each other, the second support portion 44 reliably stops at the second rotational movement end position P22 with respect to the first support portion 43.

Figure 17:
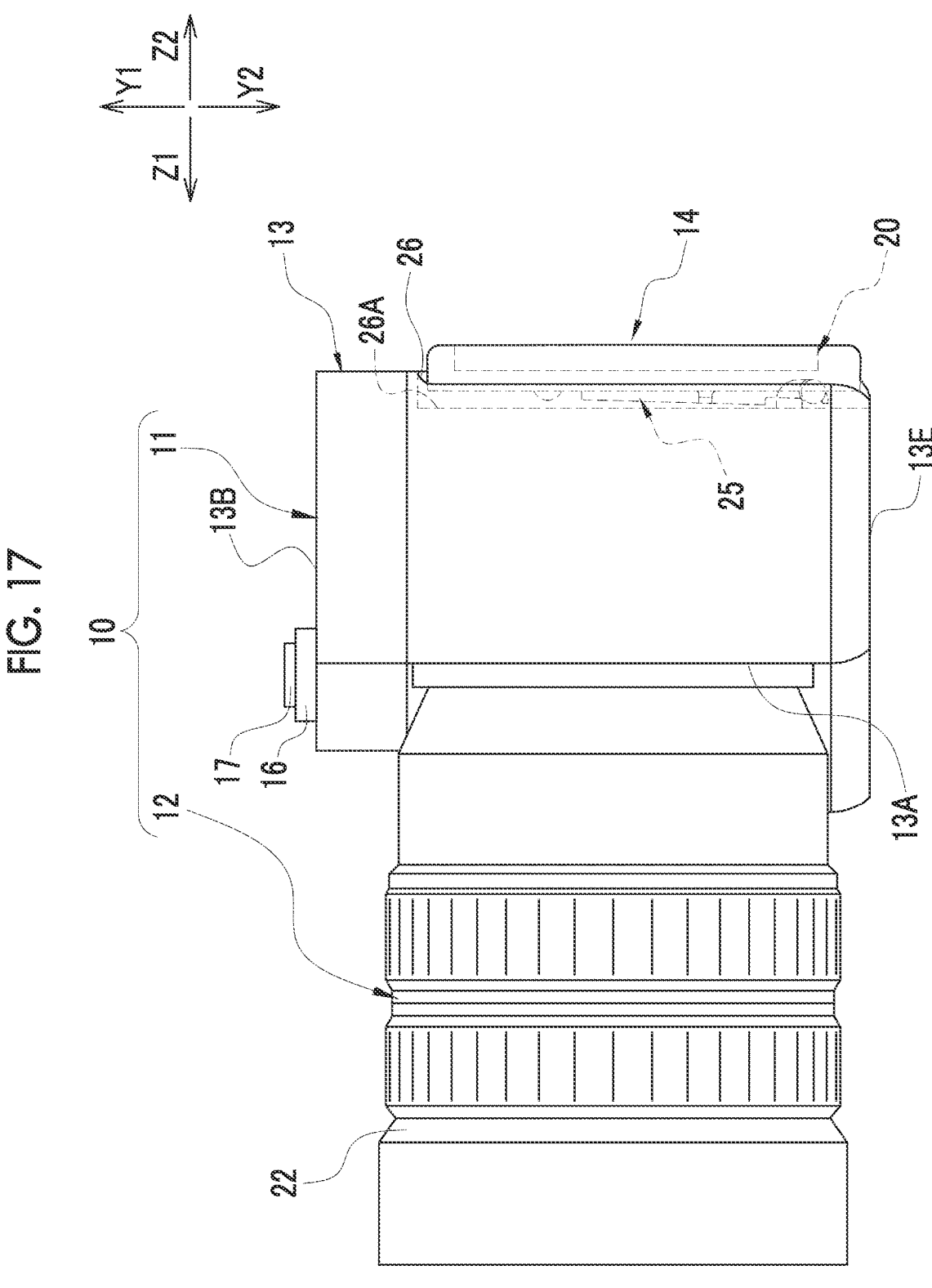
FIG. 17 is a side view of the imaging apparatus in a state in which the display unit is positioned at the closed position.

As shown in FIG. 17, in a case where the display unit 14 is at the closed position, that is, in a case where the first support portion 43 is at the above-described first rotational movement start position P11 and the second support portion 44 is at the second rotational movement start position P21, the accommodation portion 26 accommodates the display unit 14 and the angle adjustment mechanism 25.

Figure 18:
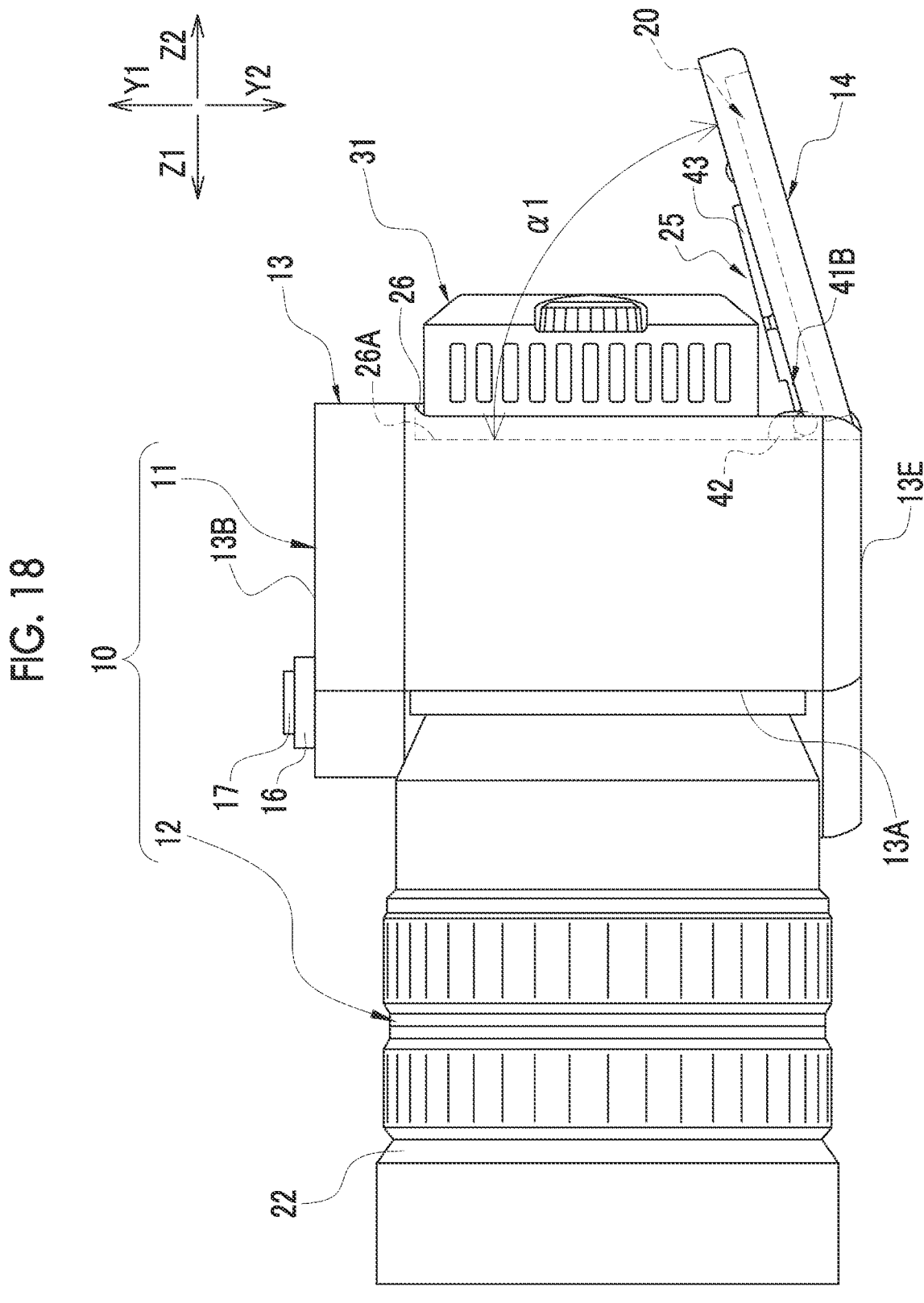
FIG. 18 is a side view of the imaging apparatus in a state in which the display unit is at the opened position and the cooling device is connected thereto.

As shown in FIG. 18, in a case where the first support portion 43 is rotationally moved from the first rotational movement start position P11 to the first rotational movement end position P12, the connection portion 27 is exposed and the cooling device 31 can be connected thereto. As described above, in a case where the first support portion 43 is at the first rotational movement end position P12 and the second support portion 44 is at the second rotational movement start position P21, the position of the display unit 14 is located on a body part 13 side in the Y1 and Y2 directions with respect to the bottom surface 13E, which is an end surface of the body part 13. The Y1 and Y2 directions correspond to a first direction within the scope of the claims.

The state shown in FIG. 18 represents a state in which the inclination angle α1 of the display part 20 is at the largest opened position. The inclination angle α1 is preferably 45 degrees or more. In this case, the connection portion 27 is exposed to the outside, and the cooling device 31 can be connected thereto.

Figure 19:
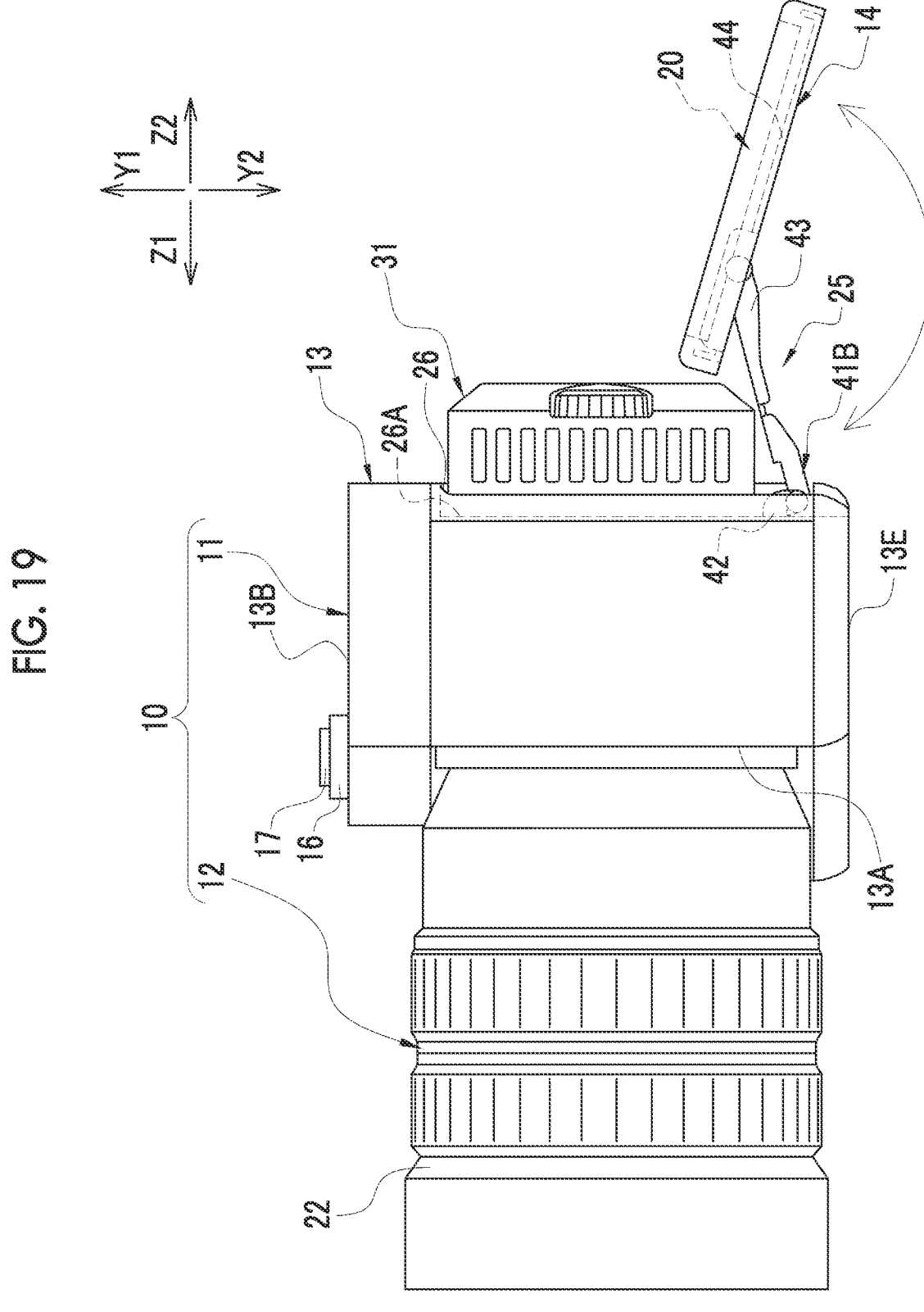
FIG. 19 is a side view of the imaging apparatus in a state in which the display unit is at the opened position, a display part is directed in a direction facing a top surface side, and the cooling device is connected thereto.

As shown in FIG. 19, in a case where the second support portion 44 is rotationally moved from the second rotational movement start position P21 to the second rotational movement end position P22, that is, in a case where the first support portion 43 is at the first rotational movement end position P12 and the second support portion 44 is at the second rotational movement end position P22, the position of the display unit 14 is located on the body part 13 side in the Y1 and Y2 directions with respect to the bottom surface 13E, which is the end surface of the body part 13.

In the states shown in FIGS. 18 and 19, the position of the display unit 14 is located on the body part 13 side in the Y1 and Y2 directions, with respect to the bottom surface 13E, which is the end surface of the body part 13. Therefore, there is no interference with the display unit 14 even in a case where a mounting platform such as a tripod is connected to the bottom surface 13E, which makes it possible for the user to observe the display part 20 in a desired orientation.

Figure 20:
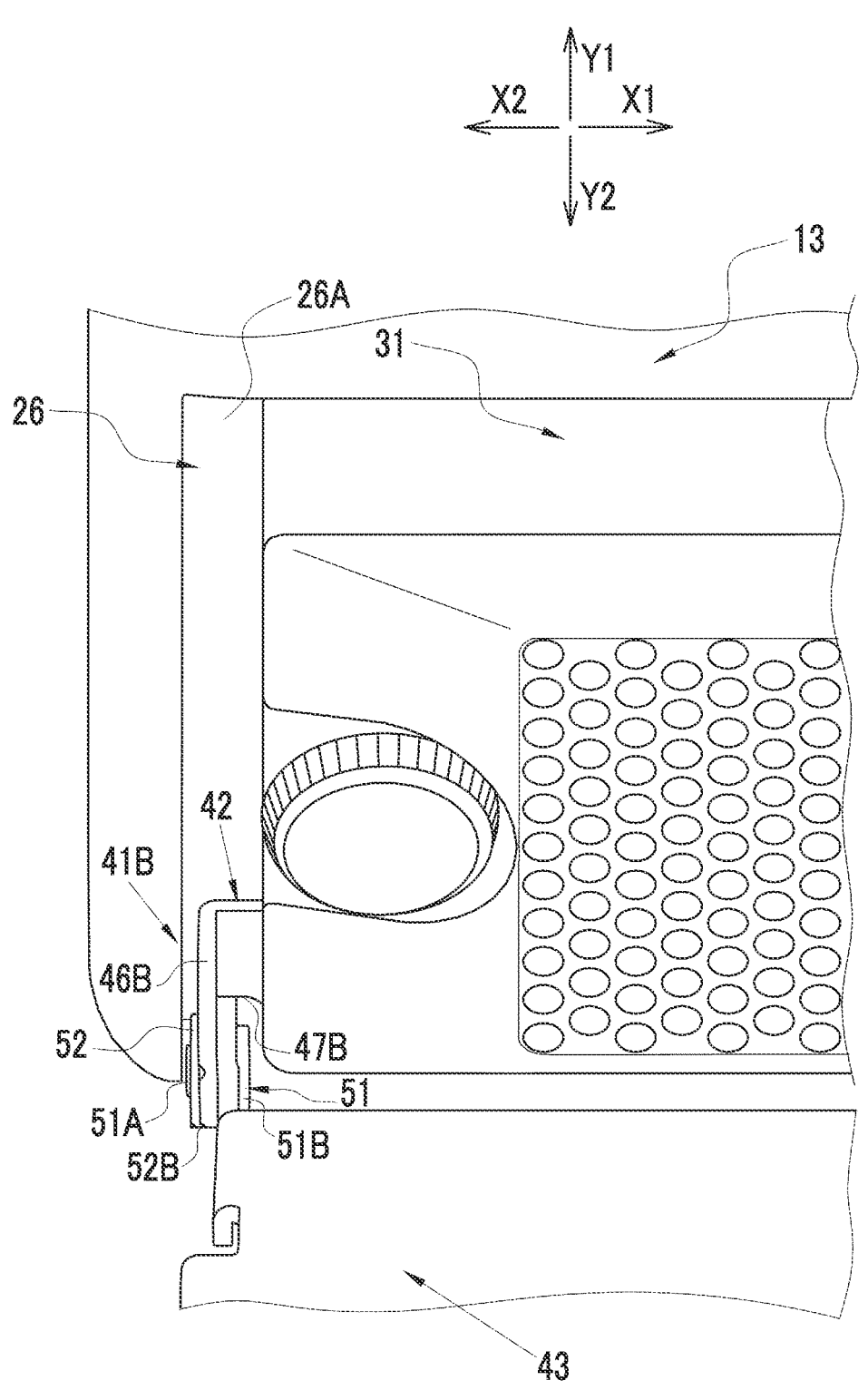
FIG. 20 is a rear view of the imaging apparatus in a state in which the display unit is at the opened position and the cooling device is connected thereto.

As shown in FIG. 20, in a case where the cooling device 31 is connected to the connection portion 27, the hinge part 41B is disposed outside (on the X2 direction side in a case of the hinge part 41B) of the cooling device 31 as viewed in the Z1 direction. In this case, except for at least a part of the common portions in the hinge parts 41A and 41B, namely the first fixed piece 45, the first intermediate part 55, and the second intermediate part 62, only the portions that operate as the hinge parts 41A and 41B are considered. In addition, although not shown, in a case where the cooling device 31 is connected to the connection portion 27, the hinge part 41A is also disposed outside (on the X1 direction side in a case of the hinge part 41A) of the cooling device 31 as viewed in the Z1 direction.

In addition, in a case where the cooling device 31 is connected to the connection portion 27, the position of at least a part of the hinge parts 41A and 41B is disposed at a position different from the position of the cooling device 31 in the Y1 and Y2 directions (see FIG. 18). By disposing the hinge parts 41A and 41B as described above, the hinge parts 41A and 41B can be operated without hindering the operation of the cooling device 31, and an inclination degree of the display part 20 can be easily adjusted. Further, since the fixed portion 42 made of stainless steel having a low thermal conductivity or the like is disposed at a position different from the position of the cooling device 31, the cooling effect of the cooling device 31 can be improved.

As described above, the digital camera 10 comprises the display part 20 and the angle adjustment mechanism 25 that adjusts the inclination angle of the display part 20 with respect to the connection target surface 26A by rotationally moving about the rotational movement axis RA1 along one side of the body part 13 as viewed in the Z1 direction, and the body part 13 comprises the accommodation portion 26 that accommodates the display part 20 and the angle adjustment mechanism 25, and the connection portion 27 that is connected to the cooling device 31 is provided in the accommodation portion 26. As a result, the digital camera 10 can adjust the inclination degree of the display part 20 and can be connected to the cooling device 31. Further, since the display part 20 and the angle adjustment mechanism 25 are accommodated in the accommodation portion 26, and the cooling device 31 can be connected thereto in a case where the display part 20 is rotationally moved to the opened position, it is not necessary to increase the space in order to connect the cooling device 31. That is, the digital camera 10 can be miniaturized.

Further, as described above, a sufficient inclination angle α1 of the display part 20 with respect to the connection target surface 26A can be taken, and the connection portion 27 provided in the accommodation portion 26 can be exposed. As a result, the cooling device 31 fits between the connection target surface 26A and the display part 20, which makes it possible to easily connect the cooling device 31 to the connection portion 27.

In the above-described embodiment, although the cooling device 31 is exemplified as the external cooling member, the present invention is not limited thereto, and a cooling member using only a fan or only a heat sink may be used, or a cooling device that uses a thermoelectric conversion element such as a Peltier element for cooling may be used.

It should be noted that the display device and the imaging apparatus of the embodiment of the present invention are not limited to the digital camera and can also be applied to a smartphone, a video camera, or the like.

The present invention is not limited to the above-described embodiment and extends to appropriately modified aspects of the above-described embodiment without departing from the present invention, of course. For example, a plurality of inventions are included in the above-described embodiment, but those may be implemented alone or two or more inventions may be appropriately combined. Further, the display device and the imaging apparatus described in the following Appendixes 1 to 13 can be understood from the description of the above-described embodiment.

Appendix 1

A display device comprising:

a body part;

a display part; and an angle adjustment mechanism that adjusts an inclination angle of the display part with respect to a first surface provided on the body part by rotationally moving about a first axis along one side of the body part in a direction view along a direction perpendicular to the first surface, in which the body part includes an accommodation portion that accommodates the display part and the angle adjustment mechanism, and a connection portion that is located in the accommodation portion and is connected to an external cooling member.

Appendix 2

The display device according to Appendix 1, in which the angle adjustment mechanism includes a hinge part, the hinge part includes a fixed portion that is fixed to the accommodation portion, and a first support portion that supports the display part to be rotationally movable around the first axis, and the fixed portion is coupled to the first support portion at a position on a side fixed to the accommodation portion in the direction view.

Appendix 3

The display device according to Appendix 2, in which the first support portion includes a rotational movement restricting portion that restricts the rotational movement.

Appendix 4

The display device according to Appendix 3, in which the rotational movement restricting portion restricts the rotational movement by engaging with the fixed portion.

Appendix 5

The display device according to any one of Appendixes 1 to 4, in which the fixed portion includes a first fixed piece that is fixed to the accommodation portion, a second fixed piece that is disposed to intersect with the first fixed piece and is coupled to the first support portion, and an engagement target portion that is formed in a first region connecting the first fixed piece and the second fixed piece, and the rotational movement restricting portion restricts a rotational movement of the first support portion by engaging with the engagement target portion.

Appendix 6

The display device according to any one of Appendixes 1 to 5,

in which the engagement target portion is a recessed
portion that is formed in the first region and that is
recessed in a direction in which the first support portion
rotationally moves.

Appendix 7

The display device according to any one of Appendixes 1
to 6,
in which, in a case where the external cooling member is
connected to the connection portion,
the hinge part is disposed outside of the external cooling
member in the direction view.

Appendix 8

The display device according to any one of Appendixes 1
to 6,
in which, in a case where the external cooling member is
connected to the connection portion,
a position of at least a part of the hinge part is disposed
at a position different from a position of the external
cooling member in a first direction orthogonal to the
first axis.

Appendix 9

The display device according to any one of Appendixes 1
to 7
in which the hinge part includes a second support portion
that supports the display part,
the second support portion is coupled to the first support
portion and makes the display part rotationally movable
around a second axis different from the first axis,
the first support portion is rotationally movable around the
first axis between a first rotational movement start
position and a first rotational movement end position,
and
the second support portion is rotationally movable around
the second axis between a second rotational movement
start position and a second rotational movement end
position.

Appendix 10

The display device according to Appendix 9,
in which, in a case where the first support portion is at the
first rotational movement end position, and the second
support portion is at the second rotational movement
end position, a position of the display part is located on
a body part side in a first direction orthogonal to the
first axis, with respect to an end surface of the body
part.

Appendix 11

The display device according to Appendix 9,
in which, in a case where the first support portion is at the
first rotational movement end position, and the second
support portion is at the second rotational movement
start position, a position of the display part is located on
a body part side in a first direction orthogonal to the
first axis, with respect to an end surface of the body
part.

Appendix 12

The display device according to any one of Appendixes 1
to 11,
in which, in a case where the inclination angle of the
display part with respect to the first surface is 45
degrees or more, the connection portion is exposed to
an outside and is connectable to the external cooling
member.

Appendix 13

An imaging apparatus comprising:
a body part;
a lens that is attached to the body part; and

the display device according to any one of Appendixes 1
to 12,
in which the body part is a body part of the imaging
apparatus, and
the first surface is a surface on a side opposite to a surface
to which the lens is attached.

EXPLANATION OF REFERENCES

10: digital camera
11: camera body
12: lens barrel
13: body part
13A: front surface
13B: top surface
13C: rear surface
13D: grip portion
13E: bottom surface
14: display unit
15: lens mount
15A: imaging aperture
16: operation dial
17: release switch
18: power switch
19: operation button
20: display part
21: imaging element
22: lens barrel body
23: imaging optical system
25: angle adjustment mechanism
26: accommodation portion
26A: connection target surface
27: connection portion
28: power supply connector
31: cooling device
32: device mounting screw
32A: screw body portion
32B: screw head portion
33: housing
33A, 36C: insertion hole
33B: intake port
33C: exhaust port
34: fan
35: power receiving portion
35A: power receiving connector
36: heat sink
36A: fin
36B: mounting surface
41A, 41B: hinge part
42: fixed portion
42A: first region
42B: first region
43: first support portion
44: second support portion
45: first fixed piece
46A, 46B: second fixed piece
47A, 47B: engagement target portion
48: screw member
49A: insertion hole
49B: click groove
51: coupling pin
51A: shaft portion
51B: disc portion
52: click plate
52A: engaging hole
52B: click protrusion portion
53A, 53B: body part-side support piece 54A, 54B: display-side support piece
55: first intermediate part
55A, 55B: rotational movement restricting portion
56A: coupling pin receiving portion
56B: insertion hole
56C: rotational movement restricting portion
57: coupling pin
57A: shaft portion
57B: disc portion
58: click plate
58A: engaging hole
58B: click protrusion portion
59A: coupling pin receiving portion
59B: insertion hole
59C: click groove
61A, 61B: support piece
62: second intermediate part
63A: coupling pin receiving portion
63B: insertion hole
63C: engagement target portion
65: display case
66: support member
71: protrusion portion
P11: first rotational movement start position
P12: first rotational movement end position
P21: second rotational movement start position
P22: second rotational movement end position
RA1, RA2: rotational movement axis
W: width
α1: inclination angle

What is claimed is:
1. A display device comprising:
a body part;
a display part; and
an angle adjustment mechanism that adjusts an inclination
    angle of the display part with respect to a first surface
    provided on the body part by rotationally moving about
    a first axis along one side of the body part, viewed in
    a direction view along a direction perpendicular to the
    first surface,
wherein the body part includes:
    an accommodation portion that accommodates the dis-
        play part and the angle adjustment mechanism; and
    a connection portion that is located in the accommo-
        dation portion and is connected to an external cool-
        ing member,
wherein the angle adjustment mechanism includes a hinge
    part,
wherein, in a case where the external cooling member is
    connected to the connection portion, the hinge part is
    disposed outside of the external cooling member,
    viewed in the direction view.
2. The display device according to claim 1,
wherein
the hinge part includes:
    a fixed portion that is fixed to the accommodation
        portion; and
    a first support portion that supports the display part to
        be rotationally movable around the first axis, and
the fixed portion is coupled to the first support portion at
    a position on a side fixed to the accommodation por-
    tion, viewed in the direction view.
3. The display device according to claim 2,
wherein the first support portion includes a rotational
    movement restricting portion that restricts the rota-
    tional movement.

4. The display device according to claim 3,
wherein the rotational movement restricting portion
    restricts the rotational movement by engaging with the
    fixed portion.
5. The display device according to claim 4,
wherein the fixed portion includes:
    a first fixed piece that is fixed to the accommodation
        portion;
    a second fixed piece that is disposed to intersect with
        the first fixed piece and is coupled to the first support
        portion; and
    an engagement target portion that is formed in a first
        region connecting the first fixed piece and the second
        fixed piece, and
the rotational movement restricting portion restricts a
    rotational movement of the first support portion by
    engaging with the engagement target portion.
6. The display device according to claim 5,
wherein the engagement target portion is a recessed
    portion that is formed in the first region and that is
    recessed in a direction in which the first support portion
    rotationally moves.
7. The display device according to claim 6,
wherein, in a case where the external cooling member is
    connected to the connection portion,
a position of at least a part of the hinge part is disposed
    at a position different from a position of the external
    cooling member in a first direction orthogonal to the
    first axis.
8. The display device according to claim 1,
wherein the hinge part further includes a second support
    portion that supports the display part,
the second support portion is coupled to the first support
    portion and makes the display part rotationally movable
    around a second axis different from the first axis,
the first support portion is rotationally movable around the
    first axis between a first rotational movement start
    position and a first rotational movement end position,
    and
the second support portion is rotationally movable around
    the second axis between a second rotational movement
    start position and a second rotational movement end
    position.
9. The display device according to claim 8,
wherein, in a case where the first support portion is at the
    first rotational movement end position, and the second
    support portion is at the second rotational movement
    end position, the display part is located on a body part
    side in a first direction orthogonal to the first axis, with
    respect to an end surface of the body part.
10. The display device according to claim 8,
wherein, in a case where the first support portion is at the
    first rotational movement end position, and the second
    support portion is at the second rotational movement
    start position, the display part is located on a body part
    side in a first direction orthogonal to the first axis, with
    respect to an end surface of the body part.
11. The display device according to claim 8,
wherein, in a case where the inclination angle of the
    display part with respect to the first surface is 45
    degrees or more, the connection portion is exposed to
    an outside and is connectable to the external cooling
    member.
12. An imaging apparatus comprising:
a body part;
a lens that is attached to the body part; and
the display device according to claim 1, wherein the body part is a body part of the imaging apparatus, and the first surface is a surface on a side opposite to a surface to which the lens is attached.

* * * * *